(12) United States Patent
Lebelle

(10) Patent No.: US 9,212,763 B2
(45) Date of Patent: Dec. 15, 2015

(54) ASSEMBLY FOR TRANSPORTING LIQUID VIA PIPES AND ASSOCIATED FLOATING STRUCTURE

(71) Applicant: Via Marina, Paris (FR)

(72) Inventor: Claude Lebelle, Croissy sur Seine (FR)

(73) Assignee: VIA MARINA, Paris (FR)

( * ) Notice: Subject to any disclaimer, the term of this patent is extended or adjusted under 35 U.S.C. 154(b) by 0 days.

(21) Appl. No.: 14/363,924

(22) PCT Filed: Dec. 6, 2012

(86) PCT No.: PCT/FR2012/052825
§ 371 (c)(1),
(2) Date: Jun. 9, 2014

(87) PCT Pub. No.: WO2013/083926
PCT Pub. Date: Jun. 13, 2013

(65) Prior Publication Data
US 2014/0352806 A1 Dec. 4, 2014

(30) Foreign Application Priority Data
Dec. 7, 2011 (FR) ..................................... 11 61294

(51) Int. Cl.
*F16L 1/16* (2006.01)
*F16L 1/20* (2006.01)
(Continued)

(52) U.S. Cl.
CPC ... *F16L 1/24* (2013.01); *F16L 1/12* (2013.01); *F16L 1/16* (2013.01); *F16L 1/20* (2013.01); *F16L 1/202* (2013.01); *F16L 1/203* (2013.01); *Y10T 137/6954* (2015.04)

(58) Field of Classification Search
CPC ............... F16L 1/12; F16L 1/16; F16L 1/203; F16L 1/205; F16L 1/207
See application file for complete search history.

(56) References Cited

U.S. PATENT DOCUMENTS 3,120,107 A * 2/1964 Juusela et al. ................. 405/156
3,494,813 A * 2/1970 Holcomb et al. .............. 156/287
(Continued)

FOREIGN PATENT DOCUMENTS

FR 1 417 987 11/1965
FR 2 260 051 8/1975
(Continued)

OTHER PUBLICATIONS

Via Marina "Transportation of fresh water in large quantities and over long distances by underwater flexible pipeline," Mar. 2009.*
(Continued)

*Primary Examiner* — Frederick L Lagman
(74) *Attorney, Agent, or Firm* — Brinks Gilson & Lione; G. Peter Nichols

(57) ABSTRACT

The invention relates to an assembly that includes a pipe for transporting liquid, deformable between an internal circular cross-section and a flattened internal cross-section that can be null and that can be folded on itself longitudinally, and a device for installing the pipe. The device includes a rotating turret about which the pipe is wound and flattened, presentation means for presenting one opposite the other in a commonly conformed state, two pipe sections, assembly means for a water-tight link between said sections, optional tensioning means for transmitting an axial tension to the elongated pipe, and means for attaching ballast to the elongated pipe.

15 Claims, 16 Drawing Sheets

(51) Int. Cl.
*F16L 1/24* (2006.01)
*F16L 1/12* (2006.01)

(56) References Cited

U.S. PATENT DOCUMENTS

| | | | | |
|---|---|---|---|---|
| 3,631,933 | A | * | 1/1972 | Bryant ............................ 175/57 |
| 4,936,707 | A | * | 6/1990 | Shishkin et al. ............ 405/184.5 |
| 5,169,264 | A | * | 12/1992 | Kimura ......................... 405/184 |
| 6,926,037 | B2 | | 8/2005 | Tan |
| 7,640,950 | B2 | | 1/2010 | Tan |
| 2004/0112452 | A1 | | 6/2004 | Tan |
| 2005/0115622 | A1 | | 6/2005 | Bennett et al. |

FOREIGN PATENT DOCUMENTS

| | | |
|---|---|---|
| FR | 2 786 246 | 5/2000 |
| WO | WO 03/081105 | 10/2003 |
| WO | WO 2008/062081 | 5/2008 |

OTHER PUBLICATIONS

Search report dated Aug. 17, 2012 from corresponding French Patent Appln. No. 1161294 (8 pages).
Search report dated Dec. 19, 2012 from corresponding French Patent Appln. No. 1259533 (8 pages).
PCT/FR2012/052825 International Search Report dated Jan. 30, 2013 (6 pages including English translation).
PCT/FR2012/052826 International Search Report dated Jan. 30, 2013 (6 pages including English translation).
XP002681859, 2010, Author: Via Marina, internet link to video: "A High Performance and Low-Cost Water Transportation System", http://2012.thewaterchannel.tv/hn/videos/categories/viewvideo/1202/drinking-water- supply/via-marina-a-high-performance-and-low-cost-water-transportation-system.
XP055035510, Feb. 27, 2009, pp. 1-4, Author: Félix Bogliolo, internet link "Transportation of Fresh Water in Large Quantities and Over Long Distances by Underwater Flexible Pipeline", http://www.semide.net/media_server/files/N/7/via-marina_presentation.pdf.

* cited by examiner

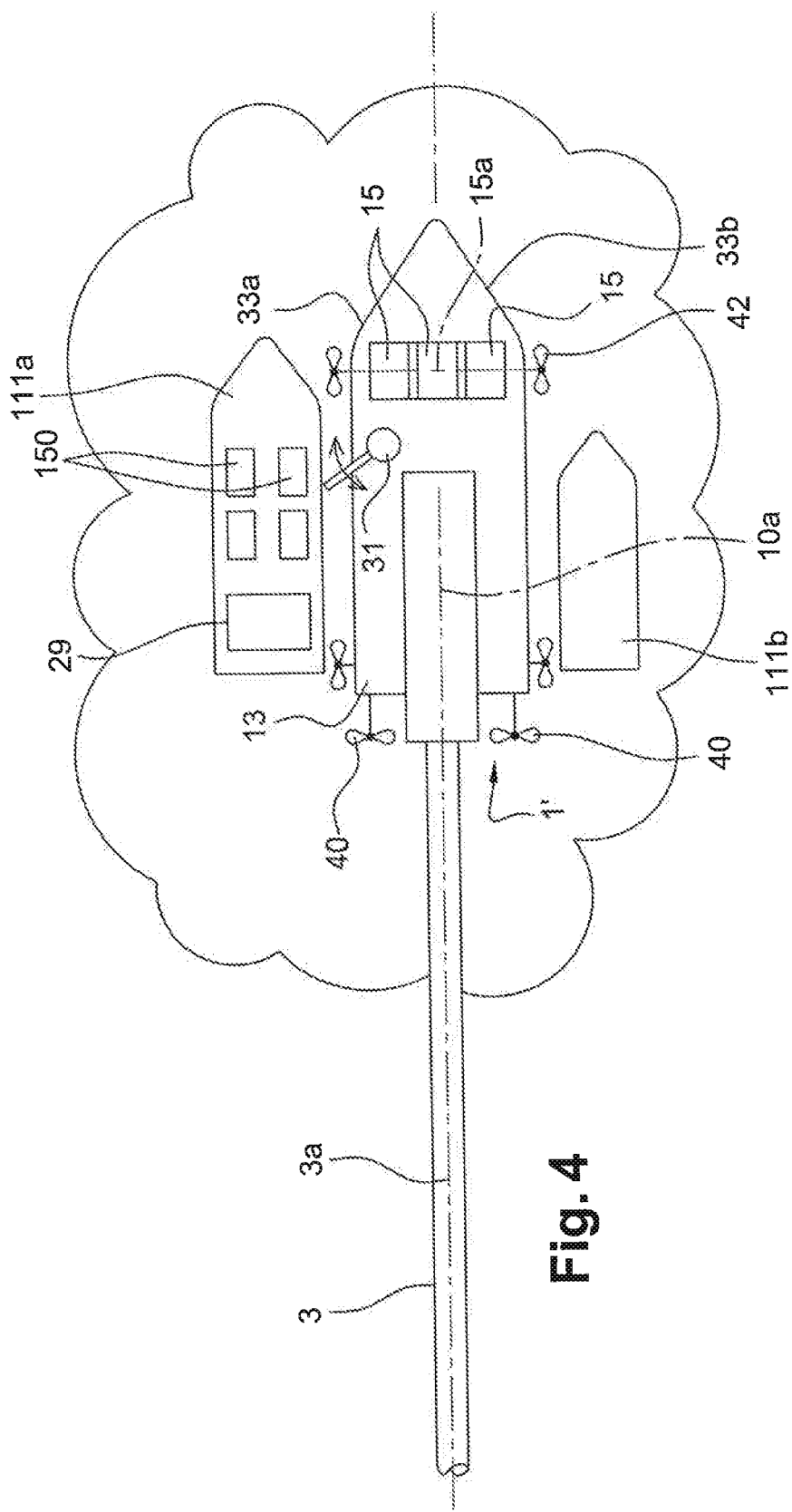

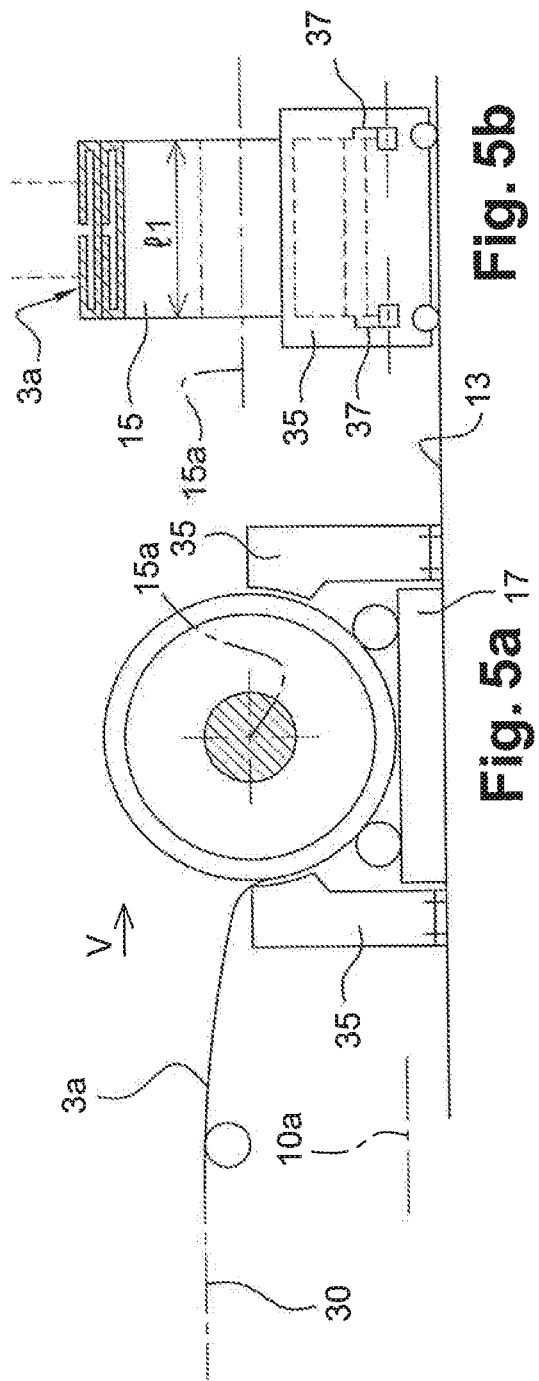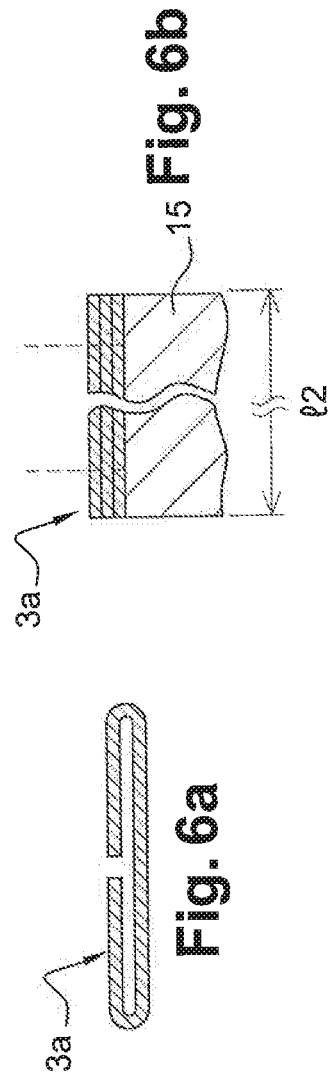

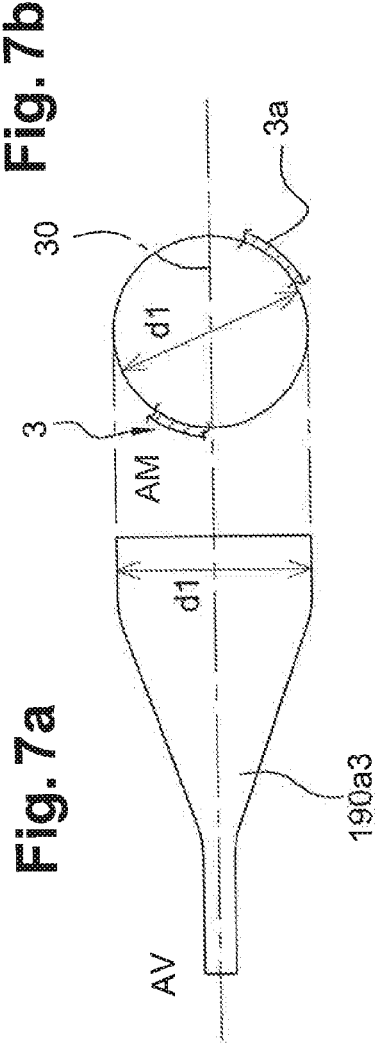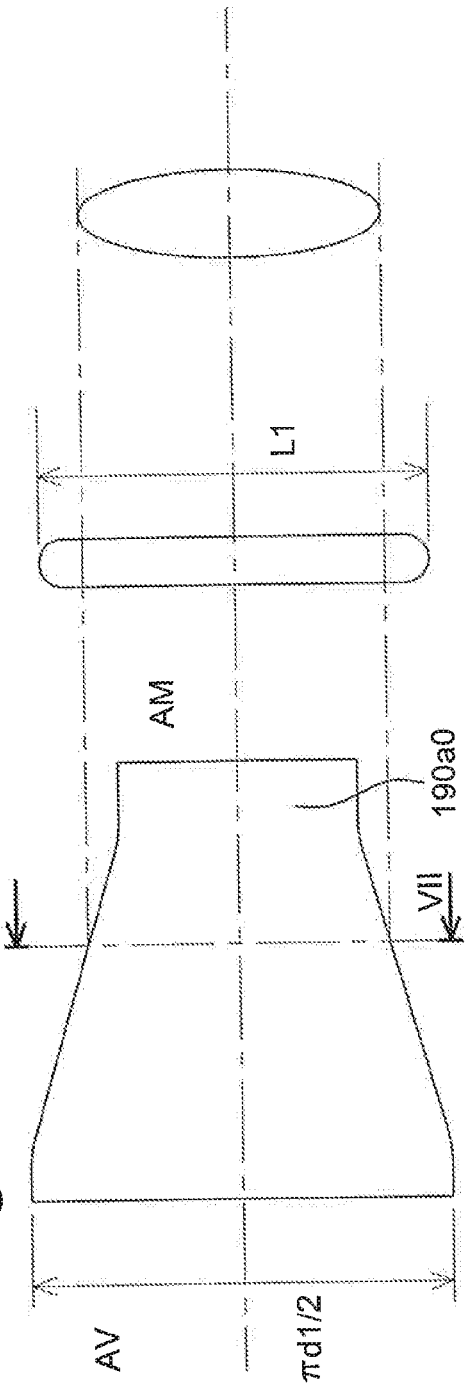

ASSEMBLY FOR TRANSPORTING LIQUID VIA PIPES AND ASSOCIATED FLOATING STRUCTURE

This application claims priority to International Application No. PCT/FR2012/052825 filed Dec. 6, 2012: and French Patent Appln. No. 1161294 filed Dec. 7, 2011: the entire contents of each are incorporated herein by reference.

BACKGROUND

The invention relates to the underwater installation of a pipe for transporting liquid, typically fresh water.

SUMMARY

It is in particular an assembly comprising the pipe to be laid and the device for laying such a pipe, which is typically usable for transporting fresh water over several hundred (or more) kilometers, at a site, this pipe being flexible and having a deformable section.

Such a transporting pipe may be installed on a seabed, at a depth which may be around 200 m.

The pipe may:
- be disposed between a fresh water dispatch point located on land and be linked by a segment that rises from the submerged laying depth as far as the shore,
- be protected by a landfall works,
- and be connected to the dispatch pump unit located on land.

At the other end, the pipe may be linked to the shore by a landfall works similar in its principle to that described for the first end and connected to an installation for receiving the fresh water.

Surge tanks located at each end of the pipe and installed on land allow possible pressure surges ("water hammers"), which could arise during operation, to be absorbed.

Pretreatment installations located upstream of the dispatch pump unit can make the fresh water transportable.

Treatment installations located downstream of the receiving installations make this water suitable for the use for which it is intended.

It is thus in this context that the invention can be applied.

A problem in this context relates to the manner of designing the pipe and its laying device so as to make this laying practical, relatively rapid and reliable, such that the laying allows the pipe to be rapidly operational (for transporting liquid) once laid.

In order to provide a favorable solution, taking at least a part of this problem into account, it is proposed that the assembly in question comprises:
- said pipe for transporting liquid, this pipe having a longitudinal axis and being:
  - flexible,
  - deformable between a circular internal section and a flattened internal section which may be zero,
  - foldable longitudinally on itself along a flattened strip (possibly having, at the location of the folds, a radius of curvature less than 10% (preferably 5%) of the diameter of its circular internal section), and
- a device for laying said pipe on site, the laying device having a longitudinal axis and comprising:
  - a rotary drum around which a first pipe portion is wound, in a state in which its section is flattened,
  - a motorized paying-out device for unwinding the pipe,
  - positioning means for positioning the first pipe portion output by the drum opposite a second portion located downstream of the first with respect to the pipe laying direction, in a state in which said portions are shaped so as to match one another, their sections being less flattened than on the drum,
  - joining means for a watertight connection between the first and second pipe portions in the state in which they are shaped so as to match one another, and for obtaining said elongate pipe,
  - and, optionally, tensioning means for transmitting to the elongate pipe an axial tension for advancing downstream and/or for moving back upstream.

A consequent problem relates to the manner of using the flexible, deformable and thus foldable nature of the pipe so as to attain a good solution to the above problem, in particular in the context of the connection of these sections.

For this purpose, it is proposed that the abovementioned positioning means comprise means for shaping the first and second pipe portions, these shaping means having, upstream and downstream of the joining means, sections which respectively increase and decrease in size from upstream to downstream along the longitudinal axis of the laying device, these sections being followed by said first and second pipe portions, when the latter pass around and along them.

Thus, as a result of the pipe running along an internal shaper (referred to above as "the shaping means"), it may be possible to obtain spontaneous deformation of the pipe which will mold itself to the shape of the outer surface of this shaper.

Another consequent problem relates to the manner of designing the drum and of shaping the pipe so as to attain a good solution to the above problems.

For this purpose, it is proposed:
- that the drum has a width oriented perpendicularly to the longitudinal axis of the pipe, this width being greater than half the perimeter of the pipe in a state in which the section of this pipe is circular, and the pipe is wound around the drum, in a flat state or in a state very close to such a flat state, not being folded on itself perpendicularly to its longitudinal axis, or
- that the drum has a width oriented perpendicularly to the longitudinal axis of the pipe, this width being less than half the perimeter of the pipe in a state in which the section of this pipe is circular,
- and that the pipe is wound in a flat state, being folded on itself perpendicularly to its longitudinal axis, around the drum. In section, the pipe can thus have substantially the shape of a squashed C.

Since a one-piece pipe appears to be difficult to use, and the connection between pipe portions is difficult to control in the case of laying which is fairly rapid and has to ensure leak-tightness (with respect to the liquid to be transported) without fail, at the junctions between these sections, with a pipe which is flat, or close to such a flattened section, at one time and round or close to this state in section at another, it is recommended that the positioning means comprise:
- a first element that is intended to be received inside the first and second pipe portions, via their respective free ends,
- a second, hollow element that is disposed around the first element such that said first and second pipe portions can be interposed, along the longitudinal axis of the pipe, between the first and second elements.

In order to promote adequate shaping of the pipe, it is recommended that the positioning means comprise:
- a first element that is intended to be received inside the first and second pipe portions, via their respective free ends,
- a second, (outer) hollow element that is disposed around the first element such that said first and second pipe portions can be interposed, along the longitudinal axis of the pipe, between the first and second elements, at least one of these first and second elements having first and second driving means, located in part upstream and in part downstream of the free ends to be joined together (a priori to be brought into abutment) of said first and second pipe portions, for driving the first or second pipe portion along the longitudinal axis of the pipe, the upstream part of the first and/or second driving means being designed to temporarily drive the first pipe portion along said longitudinal axis, over a predetermined distance, toward the second pipe portion, or conversely, via said downstream part toward the first pipe portion.

In addition, for the same sake of effectiveness and security (avoiding excessive stretching of the pipe), it is recommended furthermore that the second driving means are linked to control means in order:
- when the first and second pipe portions have not yet been joined together, to deactivate the downstream part of the first and/or second driving means with respect to the driving of said second pipe portion, and
- when the first and second pipe portions have been brought into abutment by the joining means, to activate the upstream part and/or the downstream part of the first and/or second driving means with respect to the driving of said joined pipe portions.

Thus, it may be possible to join the pipe portions when their sections are in a state in which they are shaped so as to match one another, being at least relatively rounded.

In order to manage the effective laying of the pipe downstream of the tensioning means, if they are provided, or of the joining means, and typically drive the pipe downward, in the direction of the laying site, when the abovementioned assembly is located at a greater height than that of the site, two solutions are proposed, which comprise:
- either a winch for amplifying said axial tension, at least in order to advance the pipe, downstream of the winch, and over which this pipe passes with its flattened or very nearly flattened internal section,
- or a ballasting system which does not float in water and which:
  - either is connected to means for securing said ballasting system to the pipe,
  - or is in one piece with the pipe.

If a winch is used, in order to promote a controlled application of forces to the pipe, while promoting fairly rapid and reliable laying, it is recommended that the winch is a capstan winch and thus comprises a plurality of motorized rollers (preferably each having a horizontal axis), each for transmitting a part of the axial tension, and about which the elongate pipe passes, without passing all the way round (angle less than 2 pi radians), with its flattened or very nearly flattened section (it being possible for the internal section to be zero or very close to zero).

In accordance with the usual definition in underwater pipelines, a means which "does not float" will in this case be in particular a means, such as a ballast, which, in a volume of fluid, drives or keeps an element connected to this means toward the bottom of this volume.

With a ballasting system which does not float, in order to promote the controlled driving of the pipe downward (toward the bottom of the water if it is a submerged site), it is recommended that the ballasting system comprises a flexible ballasting envelope that contains, without mixing with the liquid to be transported, a heavy material having a bulk density greater than that of sea water, the assembly, submerged in a fluid exhibiting nonstationary movements, thus tending to rest on the bottom (80) of the submersion zone.

A granular material will be practical to use and easy to find and transport.

For submerged laying, and thus to allow the submerged pipe to sway with respect to the ballasting system, depending on nonstationary movements of the submersion fluid, while the mass of the ballasting system provided with its ballast keeps it essentially fixed, it is recommended that the ballasting system is provided with a ballast and the securing means comprise a flexible connection.

In order to promote rapid and functional laying of the pipe, including in the sea, in spite of the movements of the fluid within which it is laid, such as swell and/or currents, with limited risks of damage during its laying or later, once laid, it is also proposed that means for supplying a granular material, as ballast, be provided. It is thus recommended that these supply means (which will descend through the submersion fluid) have an opening for discharging the granular material toward the bottom, or at the bottom, of the fluid in which the pipe is submerged, in and in contact with the ballasting envelope.

Features which are preferred in that they can usefully complement the quality of the above proposition are also provided later on in the description.

In addition to the above device, the invention also relates to a floating structure comprising this device which is then disposed on a deck of this structure.

In order to promote the desired rapidity of laying and the ergonomics of maneuvers, it is proposed:
- that the drum rotates about a horizontal axis,
- that the drum is able to move on the deck, transversely with respect to the longitudinal axis of the pipe, and is mounted in a removable manner on this deck,
- and that a crane, for hoisting the drums, is disposed on the deck, closer to a first edge of the floating structure than to a second edge opposite the first, at which a second rotary drum, about which a third pipe portion is wound, can be hoisted onto the deck via said crane.

It is recommended that the pipe be laid via the transom of a motorized ship with a dynamic positioning system.

Furthermore, in order to submerge the pipe in the water and keep it at or near the bottom of the submersion site, as this pipe is submerged under tension behind the floating structure which then moves on the surface and to which it is linked by said assembly, it is recommended that the floating structure comprises:
- moving means for navigation, and
- means for supplying ballast, making it possible to supply such ballast to the ballasting system, at or toward said submerged bottom, at which a first part of the pipe and of the ballasting system with which it is provided is already kept, by ballast already present in this first part of the ballasting system.

The laying method corresponding thereto is also considered innovative here.

Features and advantages will be presented below, with reference to the description of an embodiment that is schematically illustrated in the drawings, in which:

BRIEF DESCRIPTION OF THE DRAWINGS

FIG. 4 shows a top view of the laying ship and the supply and recovery ships/barges, FIGS. 5a and 5b show a drum and its operational environment, from the side and from the front (arrow V), FIGS. 6a and 6b show two possible ways of placing the pipe portion in question around the drum, FIGS. 7a, 7b, 7c, 7d and 7e show details of the shaping device (upstream and downstream parts), as do FIG. 8 (for the intermediate part) and FIG. 9 (downstream part)

DETAILED DESCRIPTION

Figure 1:
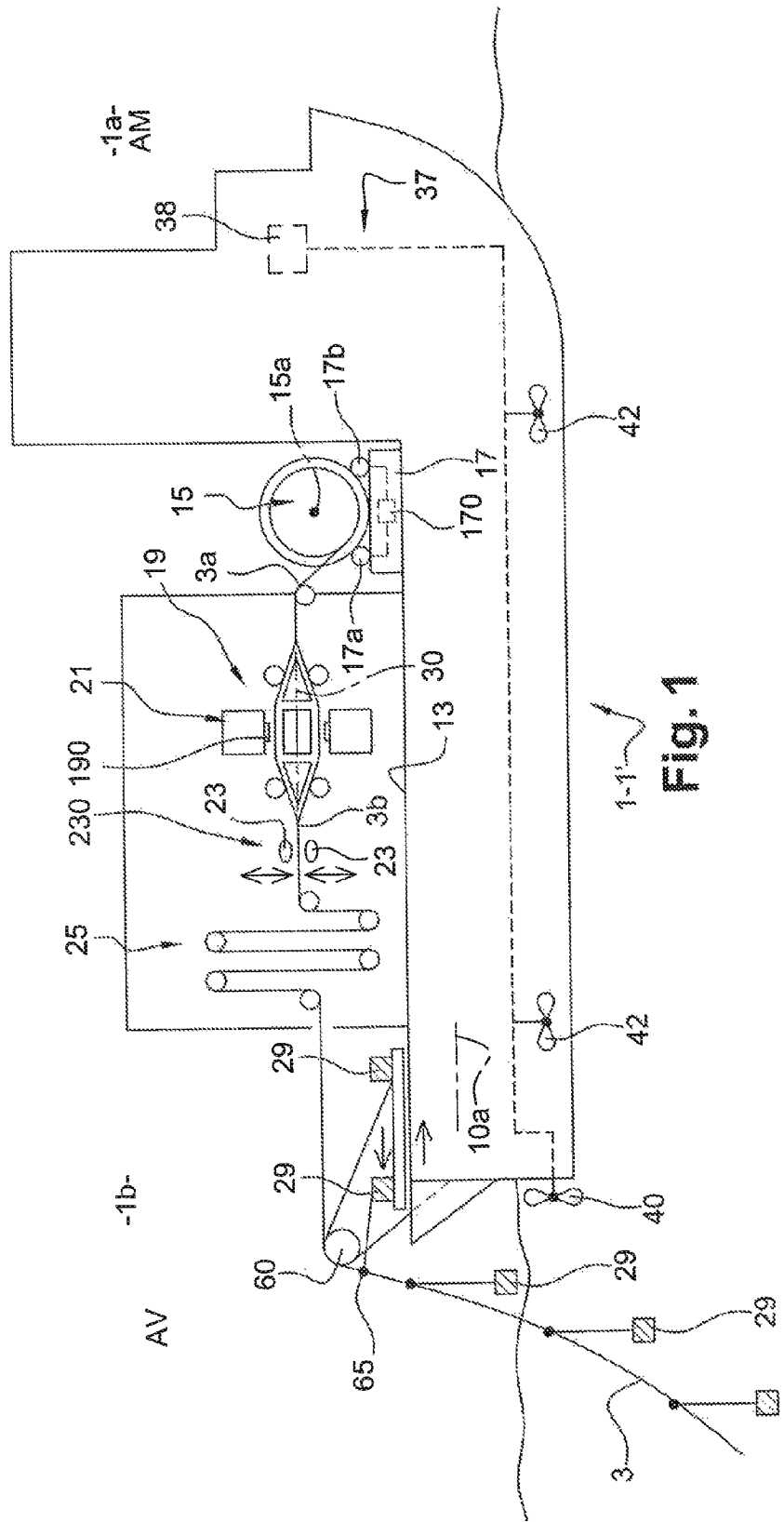
FIG. 1 shows a side view of a floating laying structure, in this case a ship with a dynamic positioning system.

FIG. 1, in particular, shows a floating structure 1 comprising a device 10 for laying an elongate pipe 3 for transporting liquid at a site 11, disposed on a deck 13 of the floating structure 1.

The laying device 10 makes it possible to lay a pipe for transporting liquid, a priori fresh water intended to be drunk (following purification treatment, if only for a maximum level of food safety), on the seabed (several hundred meters away from the shore, for example between two areas of the world).

The pipe 3 has a longitudinal axis 30. This pipe is flexible, has a deformable section between a circular internal section (FIG. 7b, internal diameter d1) and a flattened internal section which may be zero. It is also foldable on itself longitudinally. Provision can be made, at the location of the folds, of a radius of curvature of less than 10% (and preferably 5%) of the diameter of its circular internal section.

In the preferred example illustrated, the laying device 10 comprises:

a (or at least one) rotary drum 15 around which a first pipe portion 3a is wound in a state in which its section is flattened (see FIGS. 5a, 5b and 6), a paying-out device 17 having rollers such as 17a, 17b and provided with a motor 170 for driving in rotation, in order to unwind the pipe, in this case the first section 3a, positioning means 19 for positioning the first pipe portion 3a output by the drum 15 opposite a second portion 3b of the pipe, located downstream of the first with respect to the pipe laying direction 30a, in a state in which said sections are shaped so as to match one another, their sections being more or less rounded or flattened, joining means 21 for a watertight connection between the first and second pipe portions 3a, 3b in the state in which they are shaped so as to match one another, and for obtaining (as portions are joined) the pipe 3, and, in this case, tensioning means 23 for transmitting to the pipe 3a mechanical axial tension for advancing f1 downstream (AV) and/or for moving back f2 upstream (AM), a winch 25 for amplifying said axial tension (such as f3 in FIG. 1), at least in order to advance the pipe 3, downstream of the winch, and, preferably, means 27 for securing an (assembly of) ballast 29 to the pipe 3.

Thus, the quality of production of this pipe can be promoted and, in order to lay the pipe at sea, it is possible to attain optimized security, ergonomics and speed of laying.

Still in this preferred example, it is recommended that the floating structure 1, rather than a barge or platform drawn or more generally moved by a support ship, is, as illustrated (see in particular FIG. 1), a ship 1' having a dynamic positioning system comprising, from the bow 1a to the stern 1b:

the rotary drum(s) 15, the motorized paying-out device(s) 17 that thus make it possible to unwind the pipe portion from the rotary drum(s), the means 19 for positioning the first and second pipe portions 3a, 3 b, the first joining means 21 between these first and second pipe portions, the tensioning means 23, the winch 25, and the means 27 for securing the ballast 29. The securing means 27 may comprise ties for attaching the ballasting weights around the pipe and which can hang below the latter, as illustrated.

It is recommended that these means be staggered one after another along the longitudinal axis 10a of the ship 1', from the bow 1a to the stern 1b, thus parallel to the longitudinal unwinding axis 30 of the pipe.

Figure 12:
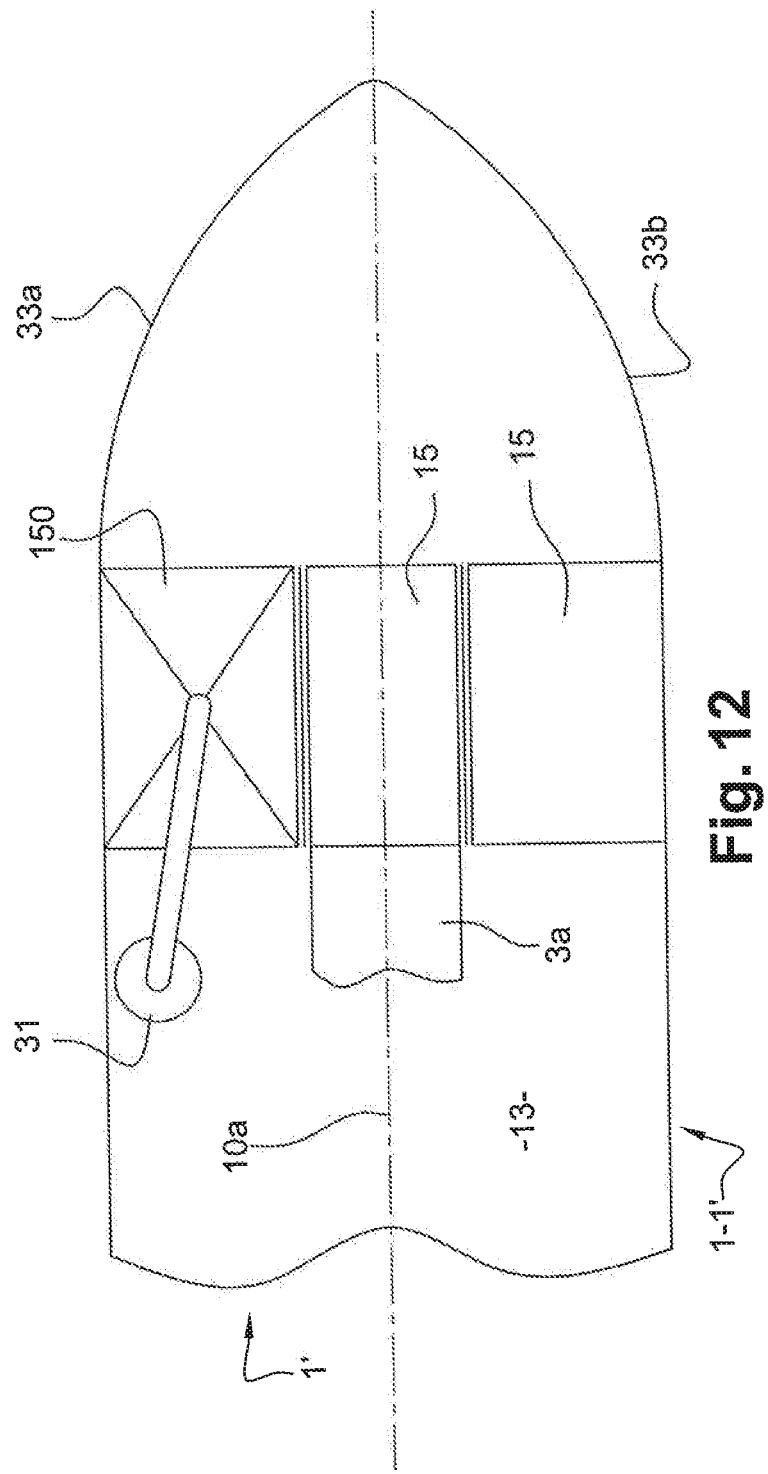
FIG. 12 shows a plurality of drums across the deck, such that the one in the center is in operation (it is unwinding), the one at the top is full, i.e. on standby, and the one at the bottom, emptied of pipe, is ready to be removed from the laying ship.

In order to facilitate and secure the maneuvers for supplying the lengths of pipes (on drums) on board and for removing empty drums, the following is recommended, as shown schematically in FIGS. 1, 3, 4 and 12: the drum 15, or each drum, once in the operational state on the deck 13, will rotate about a horizontal axis, such as 15a. In order to be replaced or conveyed, this drum will be able to move on the deck 13, transversely with respect to the longitudinal axis of the pipe (or to the longitudinal axis 10a of the ship) and will be mounted in a removable manner on this deck. A crane 31, for hoisting drums, will be disposed on the deck 13, closer to a first edge 33a of the floating structure than to a second edge 33b opposite the first (FIGS. 4 and 12). At this first edge 33a, a second rotary drum 150, about which a third pipe portion 3c will thus be wound, may be hoisted onto the deck via the crane 31.

Thus, in order to manage the supply of lengths of pipes, it may be possible, by positioning a first supply ship 111a (or any equivalent floating structure) along the first edge 33a, to lift the third pipe portion 3c, then wound around the additional drum 150 supplied by this first supply ship 111, on board onto the deck, while, at the opposite edge 33b, it may be possible next, or previously, to take off the empty drum 15 to be removed (possibly onto a second supply ship 111b), all this being done via the crane 31 (see FIG. 4).

As shown schematically in FIGS. 5a and 5b, the drum 15, and the others that follow it, may be mounted, for example via slideways, on rails 35 that are oriented (or are orientable) transversely with respect to the axis 10a. During a replacing maneuver as above, the drum 15 will be able to move on the rails 35 and be removable from the latter. During a maneuver for unwinding the pipe portion wound around it, it will be fixed securely to the rails 35. Releasable securing means 37, for example having releasable hooks, can make this possible.

In order to limit the space requirement of the drums without impairing the maneuvering of the pipe portions, two possibilities are proposed:

The first (see FIGS. 5b and 6a) is that the drum, such as 15, has a width 11 oriented perpendicularly to the longitudinal axis 30 of the pipe, this width being greater than half the outer perimeter π·d1/2 of the pipe in a circular state of the section of this pipe (see FIG. 7b). The pipe (portion in question) is then wound around the drum 15, in the flat state not folded on itself.

It should be understood, however, that the pipe may rather be in a state very close to such a flat state, that is to say an ovalized state. For example, the structure of the pipe may make such complete squashing flat of the pipe difficult or inadvisable. In this respect, this pipe will preferably consist of a tube of material woven continuously from synthetic threads.

The second possibility (see FIG. 6b) is that the drum has a width 12, oriented as above, but which will then be less than half the perimeter π·d1/2. The pipe (portion in question) will in this case be wound about the drum in the flat state (or in said state very close thereto), folded on itself.

Figure 3:
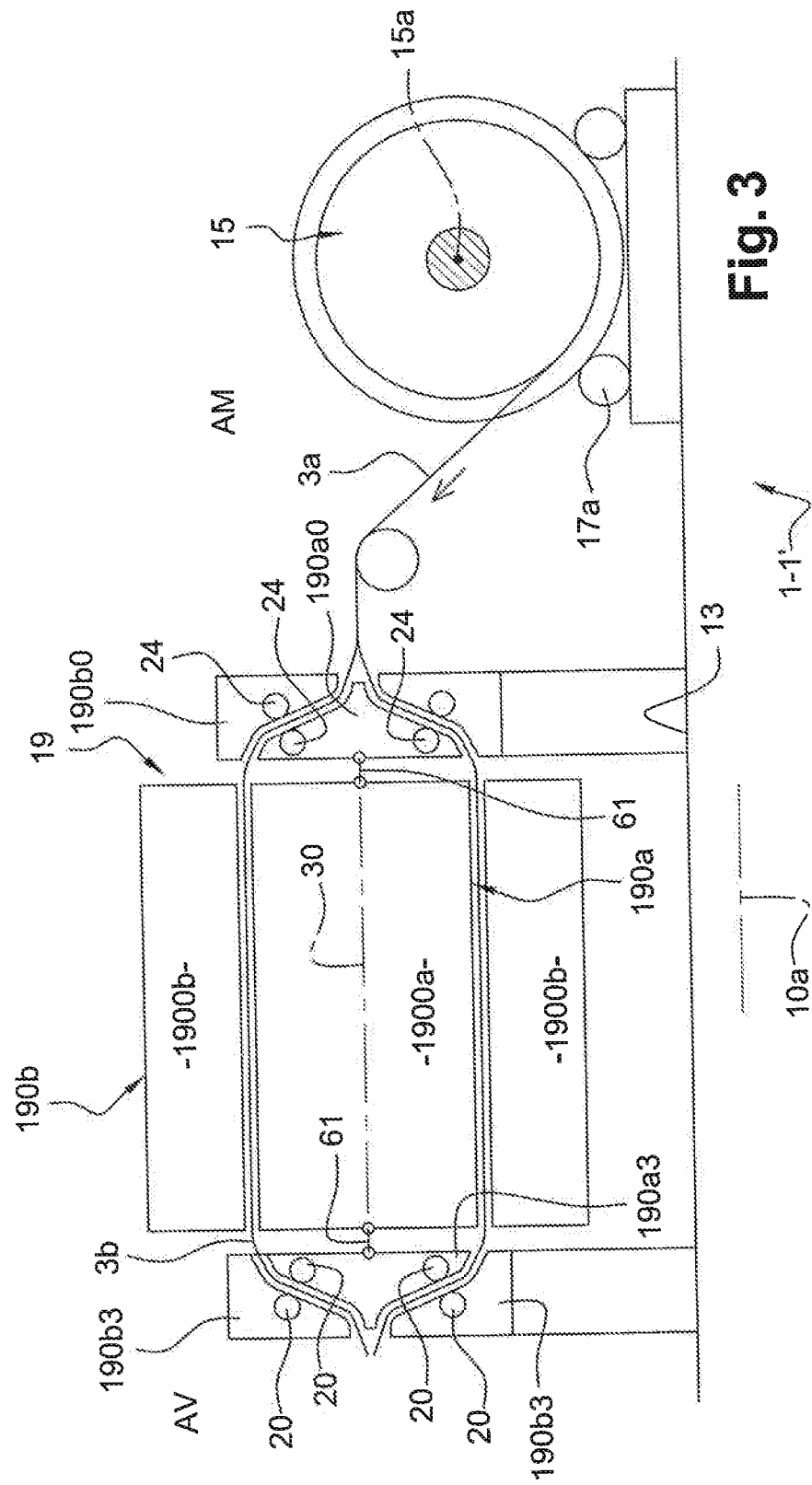
FIG. 3 shows an operational drum and the shaping device, downstream.
Figure 8:
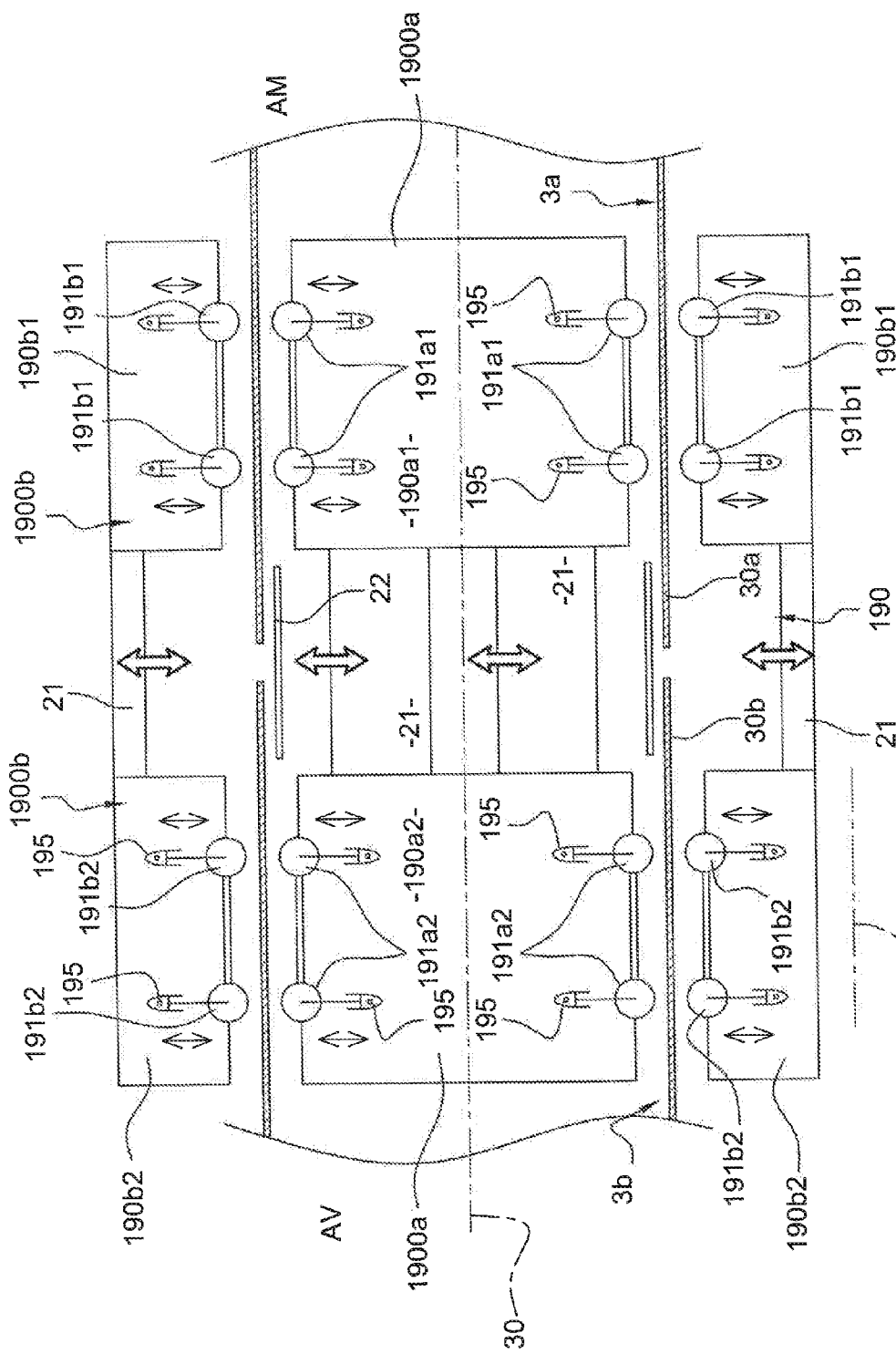

If the positioning means 19—which thus make it possible to position and bring the upstream and downstream portions to be considered into abutment, such as 3a, 3b above—are now considered, the following provisions are preferably made, in order to secure this assembly and ensure longitudinal positioning of the portions in question of the pipe, and in particular sufficiently rapid advancing under good security conditions:

As illustrated schematically in particular in FIGS. 3 and 8, the positioning means 19 comprise:

- a first element 190a, such as a cylindrical cradle that is radially expandable with respect to the axis 30, which is intended to be received inside the first and second pipe portions 3a, 3b via their respective free ends to be brought into abutment 30a, 30b,
- a second, hollow element 190b that is disposed around the first element 190a such that said first and second pipe portions can be interposed, along the longitudinal axis 30 of the pipe, between the first and second elements 190a, 190b.

At least the first element 190a, and in this case also the second, outer hollow element 190b, comprises longitudinally, along the axis 10a (or 30), three distinct sections that are staggered from upstream to downstream; see FIGS. 3, 7a, 7b, 7c and 7d:

- a first, upstream, section, respectively 190a0, 190b0, the cross-sectional area of which increases in size in the downstream direction along the axis 10a, opposite the first pipe portion 3a,
- a second, intermediate section, respectively 1900a0, 1900b0, the cross-sectional area of which is (approximately) constant along the axis 10a, just before and after the joining zone (means 21, 22),
- a third, downstream, section, respectively 190a3, 190b3, the cross-sectional area of which decreases in size in the downstream direction along the axis 10a, opposite the second pipe portion 3b.

These sections will play the role of a shaper (especially the first and third sections) with respect to the pipe which thus, from the flattened section which it has on leaving the drum 15, will be able to be elastically deformed so as to be made round or follow a rounded section, such as an approximately elliptical section, in particular opposite the joining means 22, before returning more or less to its flattened section at the end of the section 190a3, 190b3.

In FIG. 7a, the third section 190a3 passes (upstream, AM) from a circular or elliptical section with low eccentricity, with an outer perimeter slightly smaller than the inner perimeter (π·d1) of the pipe (FIG. 7b), to, further downstream (AV), a section in the form of an oval that is very elongated horizontally (FIG. 7d), with a large width L1 again slightly less than the inner perimeter (π·d1) of the pipe which, as above, moulds itself, in a substantially elastic manner, to this shape that is imposed on it.

In FIG. 7c, the first section 190a0 passes (upstream, AM) from the oval section that is very elongated horizontally (FIG. 7d), with a large width L1 to, at its downstream end (AV), said circular or elliptical section with low eccentricity, with its outer perimeter slightly less than the inner perimeter (π·d1) of the pipe (FIG. 7b).

FIG. 7e shows an intermediate state of the section, and thus of the pipe, the change in section preferably being continuous.

Figure 9:
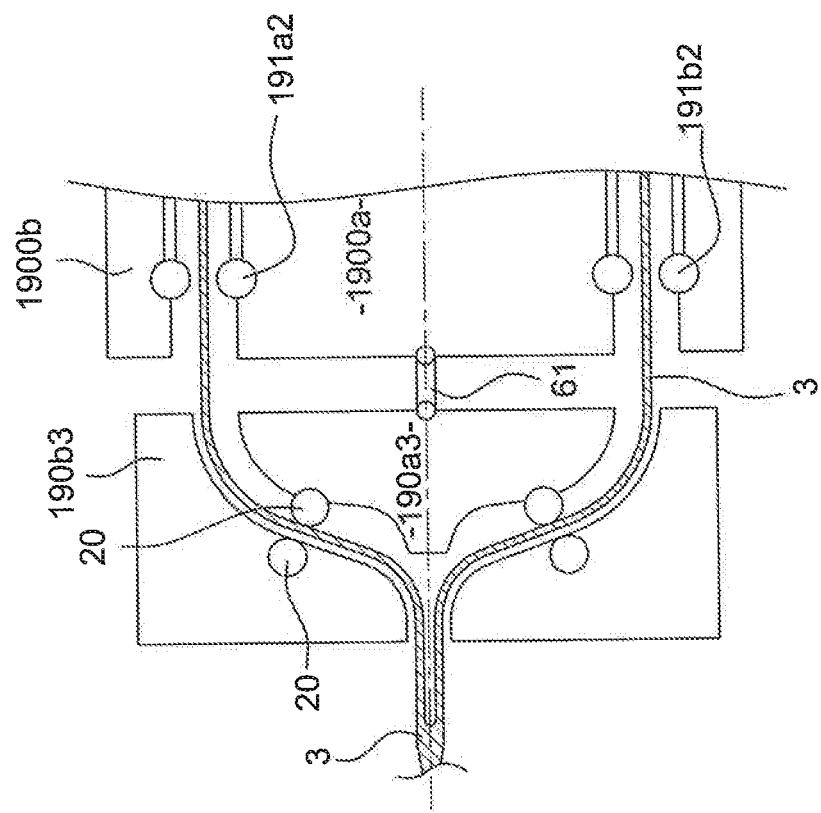

In FIGS. 3 and 9, preferred shaping of the second, intermediate sections 1900a0, 1900b0 of the elements 190a, 190b can be seen more precisely. These intermediate sections each comprise an upstream part 190a1, 190b1 and a downstream part 190a2, 190b2, positioned respectively, during abutting, opposite the first and second pipe portions 3a, 3b (see FIG. 8).

At least one of these first and second elements, in this case both, will preferably have first and second driving means for driving the first or second pipe portion 3a, 3b along the longitudinal axis 30. Again, these first and second driving means each comprise an upstream part 191a1, 191b1 and a downstream part 190a2, 190b2, respectively positioned, during abutting, opposite the first and second pipe portions 3a, 3b (see FIG. 8).

Preferably, each of this upstream part 191a1, 191b1 and this downstream part 190a2, 190b2 will be provided with adjustable bearing and spacing-apart means 195, such as hydraulic cylinders which make it possible to adjust the radial position of the first and second driving means, so as to clamp the wall of the pipe 3 between the shoes, at the desired radius; cf. FIG. 8.

Preferably, the upstream part of these first and/or second driving means 191a1, 191b1 is designed to temporarily drive the first pipe portion 3a along said longitudinal axis 30, in the downstream direction (AV), over a predetermined distance, toward the second pipe portion 3b positioned between the downstream part 190a2, 190b2, and the free end of which is positioned opposite abutment means 22. Very possibly, the opposite may be provided: via said downstream part (191a2, 191b2) of the abovementioned means, move the second pipe portion 3b in translation in the upstream direction toward the first. This will bring about a tension in the pipe portion already laid, which may be compensated by the laying structure being moved backward.

It is recommended that said upstream and downstream parts (191a1, 191b1; 191a2, 191b2) of the abovementioned means are disposed so as to act along the axis 10a/30, with a priori a capacity to move together and apart in pairs (191a1 with 191b1 and 191a2 with 191b2), transversely with respect to the abovementioned axis, so as to be active (with if necessary a variable pressure on the pipe) or inactive at the desired times (see below) with respect to the pipe portion(s) arranged opposite.

In order to avoid an excessive sliding length of the means 190a along the longitudinal axis 10a of the ship, this length being incompatible with the maximum space requirement allowed on board, axial downstream 20 and upstream 24 stops (FIGS. 3 and 9) are provided upstream and downstream, at the location of the internal and external sections 190a0, 190b0 and 190a3, 190b3.

Preferably, flexible couplings 61 will axially link the internal parts 190a0, 1900a, 190a3.

In connection with the above, it is also recommended, with the same aim as above, that the downstream part 191a2, 191b2 of the first and/or second driving means be designed to drive the joined-together first and second pipe portions (3a, 3b) together in the downstream direction.

In fact, it is even recommended that the second driving means be linked to control means 63 (FIG. 8) in order:
  when the first and second pipe portions (3a, 3b) have not yet been joined together, to deactivate the downstream part 191a2, 191b2 of the first and/or second driving means with respect to the driving of said second pipe portion, and
  when the first and second pipe portions have been brought into abutment by the joining means 22, to activate the upstream part and/or the downstream part 191a2, 191b2 of the first and/or second driving means with respect to the driving of said joined pipe portions.

Coordinated actions of the first and second driving means in order, in the active phase, to act on either side of the wall of the pipe, against said wall, are recommended, for example via cylinders controlled by the control means 63 (FIG. 8, the connections with the downstream part 191a2, 191b2 have not been illustrated).

In the same way, it is recommended that once the first and second pipe portions have been joined together via the means 21, both the upstream and downstream parts 191a2, 191b2 of the first and second driving means are activated by the control 63, coordinated with the maneuvers of the ship, and in particular its advancement along the axis 10a.

The join between the portions 3a, 3b will preferably be an abutment with one of the ends of the pipe portion being covered by the other, over a variable distance depending on the scenario, typically 50 cm to 2 m (not shown).

Typically, the joining means 21 will be able to move transversely with respect to the axis 30, between a spaced-apart, radially set back, position of the edge-to-edge ends of the pipe portions and a joining position, radially against or very close to these ends of the pipe portions 3a, 3b (see double arrows in FIG. 8).

The joining means 21 may comprise welding means, such as a welding ring 22 (FIG. 8) that can be applied to the ends to be welded of the portions 3a, 3b by expandable (and subsequently retractable) joining means 21. The pipe portions will be made of fusible plastic material (a priori reinforced by fibers, threads, or other mechanical reinforcing structures for the flexible tube), that can be joined together by heat sealing, in a leaktight manner with respect to the liquid in question.

Further preferably, the first means 191a for temporary driving will be inactive with respect to the driving of the second pipe portion 3b until said free ends 30a, 30b of the first and second pipe portions are connected together in a watertight manner by the joining means 21.

Thus, the security, ergonomics and rapidity of joining will be combined in the best possible way.

Figure 10:
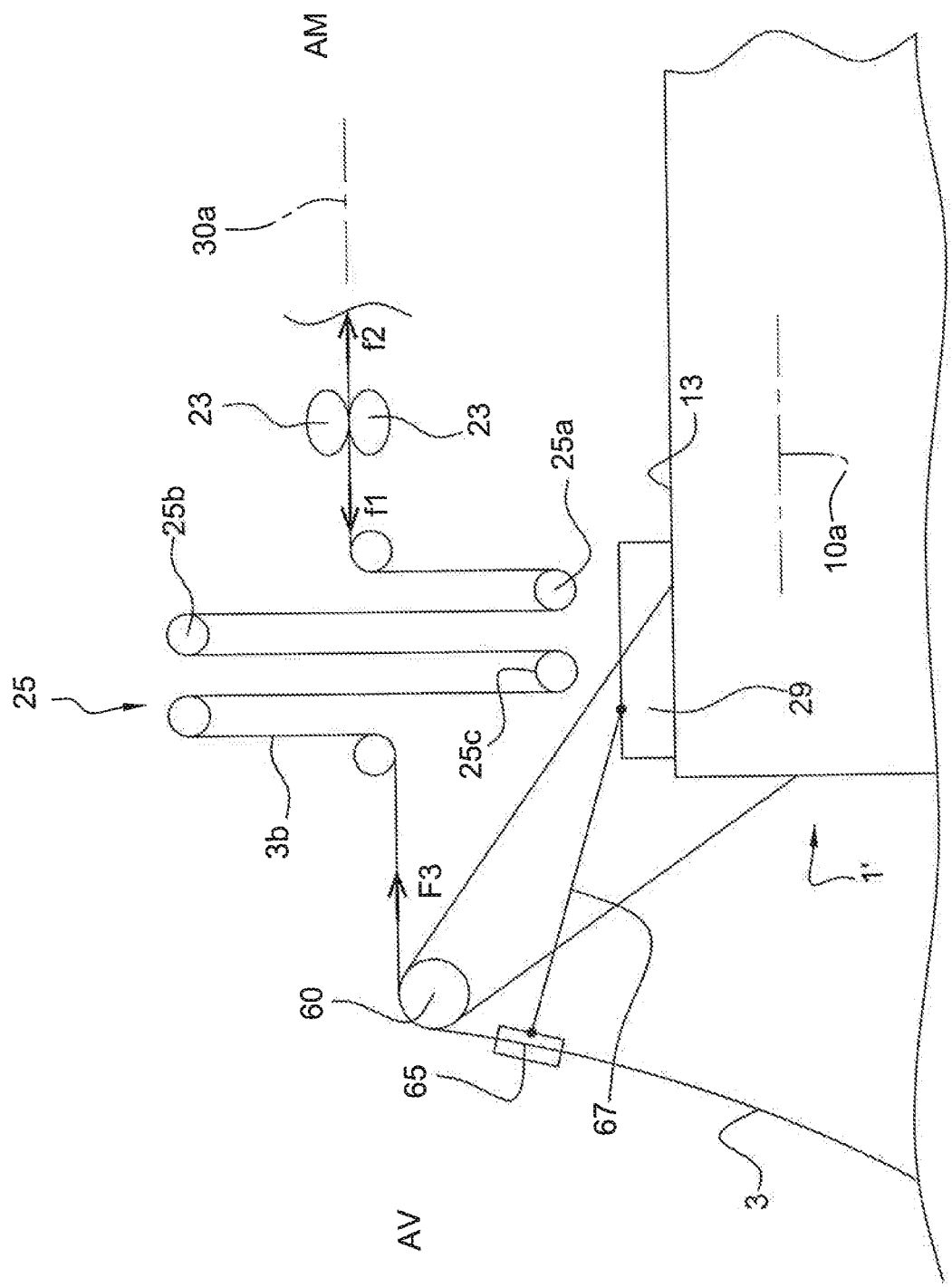
FIG. 10 shows the rear of the deck of the ship: tensioning means, winch, and means for laying ballasts and axially overhanging rear roller for the start of laying of the ballasted pipe.

Even further downstream on the deck 13, it is furthermore recommended that the winch 25 be a capstan winch, having a plurality of motorized rotary rollers, such as 25a, 25b, 25c, each having a horizontal axis, these axes being offset in height, preferably for at least two of them with respect at least to the third; see in particular FIG. 10. Downstream of the positioning means 19 and joining means 21 (and thus closer to the stern than these), the elongate pipe 3 passes successively around these rotary rollers. Each roller rotates (about an axis perpendicular to the axis 30a or 10a) in the opposite direction than the following roller, the rollers being staggered along the longitudinal axis 10a and/or 30a. By way of their individual controls, which may be different from one motor to another, the motors of the rotary rollers make it possible to vary the tension on the pipe 3.

With respect now to the installation of the pipe, the following may be noted:

The installation is organized in a continuous marine yard between the upstream and downstream landfalls.

The installation of the landfalls is carried out depending on the particular features of the site for installing the work.

Figure 11:
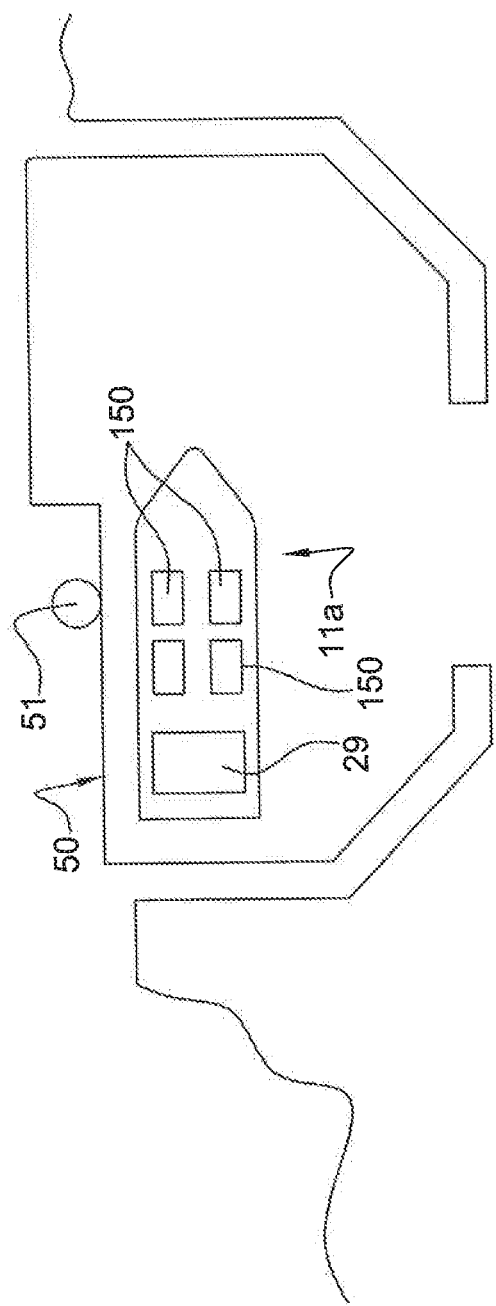
FIG. 11 shows a supply or recovery ship or barge, in port.

The means employed comprise essentially:
  a base 50 for marine operations which is a port that can accept ocean-going vessels such as 111a, 111b, having a deep water quay and means 51 for handling heavy loads, such as cranes (FIG. 11),
  the laying ship 1' (or the abovementioned floating structure), which is thus provided with a dynamic positioning system 37 (with a central control 38 and axial 40 and lateral 42 propellers; see FIGS. 1 and 4), and with a deck surface 13 for the installation of the abovementioned devices (15-27) suitable for laying the work (the pipe 3 with its ballasts 29). Decked for example over an area of about 800 m$^2$ and open at its transom 112, it is provided with an on-board crane 31 which will preferably have compensation for heave,
  the transport ships, such as 111a, 111b, can continuously provide the laying ship 1' with flexible pipe portions and ballasts (FIGS. 4 and 11). These loads are thus transferred on board the laying ship with the aid of the on-board crane,
  ships for surveying the seabed (also known as "survey boats") can be used to verify, upstream of laying, the absence of obstacles in the predefined route for the work, and downstream to verify the correct position of the work, after it has been laid on the seabed.

An alternative to the dynamic positioning system of the naval support (ship) or of the floating structure in question would consist in using a static anchoring system comprising a plurality of, for example six or eight, lines of anchors to be moved at regular intervals. The servo-control of the winches would then preferably by controlled by the absolute position of the naval support. This is not the preferred solution, taking into account the desired laying.

The mounting of the drum 15 with its flexible pipe portion on the motorized paying-out device 17 makes it possible to unwind the pipe at the speed required by the laying.

Next, the unwinding and advancing of this pipe portion (which is then flattened) as far as the abutment station 190 make it possible to return the pipe to a cylindrical shape having a circular, or ovalized, base, allowing the abovementioned joining of their ends.

For this purpose, the abutment station 190 is thus provided with the abovementioned ones of said means 19 that are present inside the pipe and pass through the two portions, such as 3a, 3b, over an axial distance limited by the downstream 20 and upstream 24 stops (FIG. 3), during laying.

At the abutment station, the end 3b of the pipe portions that have already been brought into abutment one after another and are being laid, is immobilized with the aid of the positioning means 19. The end of the extending portion 3a is then conveyed to the abutment station and inserted into the positioning means 19, between the structures 190a and 190b.

The ends of said upstream and downstream portions are then brought into abutment.

Downstream of this abutment station, the downstream part 190a3 of the shaping device 190a that is present inside the pipe and thus passes through the pipe makes it possible to return the flexible pipe 3 to its flattened (or at least flatter) strip shape.

The pipe 3 thus enters the tensioning device 230 which, via the tensioning means 23 that it comprises, and which may have belts for which the rolling speed and pressure on the pipe are controlled in a variable manner, will thus transmit an axial tension to said pipe. This can thus be carried out by friction, i.e. under pressure, between the abovementioned contact means and in this case the outer and inner walls of the pipe 3.

The tensioning means 23, 230 are advantageously controlled by the advancement of the laying ship so as to advance the flexible pipe toward the rear 1b (downstream) of the laying ship at the same speed as this ship advances via its driving motor(s).

Motorized control, which may if necessary be servo-controlled, of the tensioning means 23 makes it possible to advance or move the flexible pipe backward in these tensioning means.

The pipe then passes, further downstream, into the winch 25 where the tension present in the pipe 3 is amplified by the application of a torque to each of the abovementioned rollers, or reels, of the winch. If, as preferred, the winch has a plurality of successive rollers on which the pipe 3, subjected to an axial tension which presses it against the outer wall of the roller, is also subjected to an increasing tension on account of the friction that exists between the flexible pipe and the roller surface. The winch, in this case the rollers 25a, 25b, 25c, is (are) controlled depending on the advancement of the pipe 3 in the tensioning means 23.

At the exit from the winch, the tension present in the pipe 3 is a multiple of the tension imparted by the tensioning means 23. This multiple depends on the rotation commands of the motors of the rollers of the winch 25.

By way of the tension that they impose on the pipe (pressure exerted), the tensioning means 23 control the winch 25, being servo-controlled to the advancement of the ship 1'.

Figure 2:
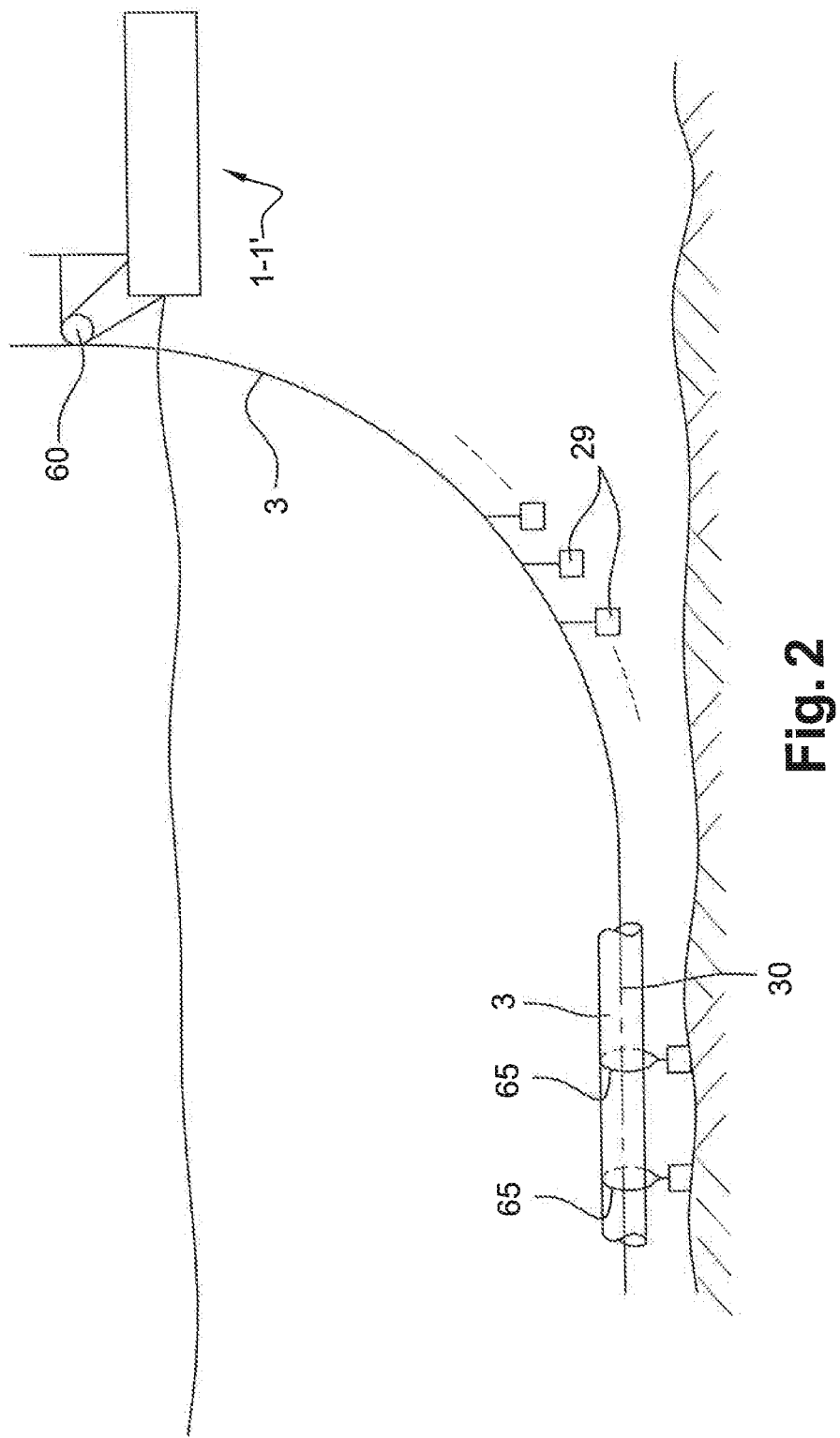
FIG. 2 shows the rear of the ship and the pipe laid on the seabed.

The pipe 3 then arrives at the rear roller 60 of the laying ship against which it rests at the start of the free span between the laying ship and the seabed 11 (see in particular FIG. 2).

Downstream of (behind) this rear roller, the ballasts 29 are secured to the pipe 3 so as to finish the preparation of the work 3, 29 to be submerged which thus comprises the flexible pipe 3 and its ballasts.

It is recommended a priori that the ballasts 29 are secured to the flexible pipe at regular intervals.

A ballast handling device makes it possible preferably to provide them at regular intervals at the securing station. Securing, for each ballast, can be carried out by a hoop 65 which surrounds the pipe and from which a weight forming the ballast is suspended by a cable 67. Once the hoop has been passed around the pipe, it is clamped in order to be held in place. FR-A-2859265 discloses a ballasting solution.

When the ballasting system is secured to the flexible pipe, the assembly is heavy and does not float in sea water. The free span between the seabed and the surface takes the form of a catenary curve, the parameters of which depend on the features of the project: weight which does not float of the assembly, depth of the water and laying tension.

As the laying ship 1' advances following abutment/joining of the pipe elements, such as 3a, 3b, the tensioning means and the winch advance the flexible pipe 3 in the downstream direction (behind) the laying ship and the free span moves, more or less retaining its equilibrium shape.

A length of the work 3, 29 is deposited on the seabed, this length corresponding approximately to the length by which the tensioning means 23 have advanced the pipe, at a relatively constant tension.

The free span has a length determined by the horizontal tension applied at the head of the work 3, 29.

Figure 13:
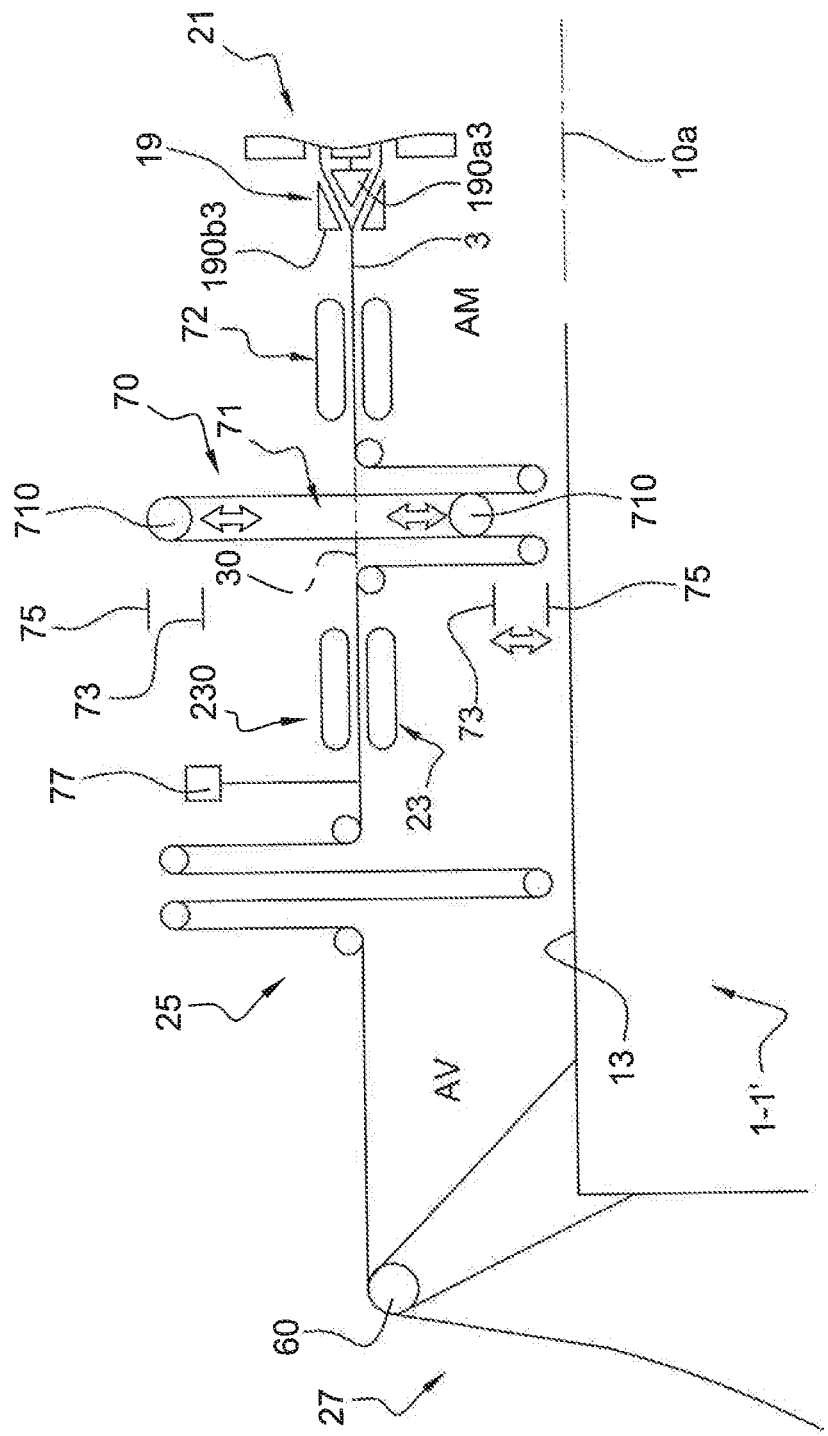
FIG. 13 shows the possible addition of a device for compensating for heave and/or surge at sea.

In FIG. 13, a possible device 70 for controlled adjustment of the pipe length and introducing slack (into this same pipe 3) is shown, which may be provided to ensure compensation for heave in the sea of the ship 1', or of the naval structure in question if it is subjected thereto, or for surge. This is intended to limit the effect on the pipe 3:

of this movement in translation of the vessel which corresponds to the up and down movement of the hull,
and/or of the back-and-forth movement of a vessel, this being caused in general by the action of the waves.

For this purpose, second tensioning means 72, located upstream (AM) of the first tensioning means 23 make it possible to axially restrain or to enable the axial movement in translation of the pipe 3. The pipe is then in a flattened state, preferably flat with its internal section zero. The second means 72 may be the same as the first 23. Functionally connected to one and/or the other of these tensioning means 23, 72 is a reserve 71 of pipe length which makes it possible to pay out or adjust a length of this pipe 3, depending on the heave and/or surge. The rear roller 60 may be a positioning reference in this respect. In addition, servo-control 77 of this/these movement(s) of the ship, or of the structure, is preferably provided, this taking into account mechanical over-tensions and under-tensions (slack) detected by a sensor of the servo-control system 77. The reserve 71 may comprise rollers (in this case two) 710 having variable positions, around which the pipe passes between the two tensioning means 23, 72 and which lengthen or shorten to a greater or lesser extent the path it follows, by moving in this case between two positions 73, 75 respectively closer and further away from the reference axis 30 of the pipe which connects the two tensioning means 23, 72. As illustrated, the second tensioning means 72 are preferably located downstream (AV) of the positioning device 19 and of the joining means 21, in this case downstream of the downstream shaping means 190a/190b3. Specifically, positioned between the abutment station and the tensioner disposed at the entry to the capstan winch, these means 72 will make it possible to advance the pipe at a constant speed and thus allow the winch and its tensioner to function at a constant speed. It may be possible to keep the tension in the free span constant by giving or taking pipe length, depending on the state of the sea.

In this case, in these second tensioning means 72, and of course also further downstream, the pipe 3 will have a flattened section, as it is being laid.

As illustrated, these means 72 may consist essentially of a frame carrying three parallel reels or rollers, two of which are fixed and one is mobile, sliding perpendicularly to its axis along the frame. The flexible pipe 3 under tension enters this device at the fixed upstream (AM) reel, passes up onto the mobile reel and passes back down again to the fixed downstream reel. The mobile reel may be kept in position by hydraulic cylinders that can move it up or down parallel to its axis. The length of hose between the entry and exit of the device is variable, determined by the position of the mobile reel. The hydraulic cylinders may be servo-controlled to the system for managing the position of the naval support (dynamic positioning system).

In FIG. 13, the disposition substantially in one and the same horizontal line of the exit of the downstream shaping means 190a/190b3, of the means 72, 23 and of the inlet to the rear roller 60 will also be noted.

In the above text, it should be clear that the ballasting of the pipe 3 may be carried out differently, in particular by substantially continuous ballasting. For example, the pipe (and its upstream extending portions 3a) could be provided with a, for example longitudinal, sheath which is segmented into hollow compartments that are filled or are intended to be filled with a heavy material (having a bulk density greater than that of the fresh water being transported) and which could be interrupted (in a sealed manner) close to each free abutting end, where the joining means, such as 21, 22, are intended to be employed. The longitudinal sheath, segmented into compartments, may be in one piece with the pipe and made of a flexible, permeable material comparable to that of this pipe in order to be bendable and resistant like the latter. From a practical point of view and for the sake of effectiveness (in particular rapidity) of laying, it is nevertheless recommended to use ballasting which is discrete or non-discrete but not in one piece with the pipe, with the ballast being secured to the elongate pipe downstream of the tensioning means and the winch.

Provision may also be made for the ballast to be laid in part with the pipe and in part after the laying of the pipe.

Figure 14:
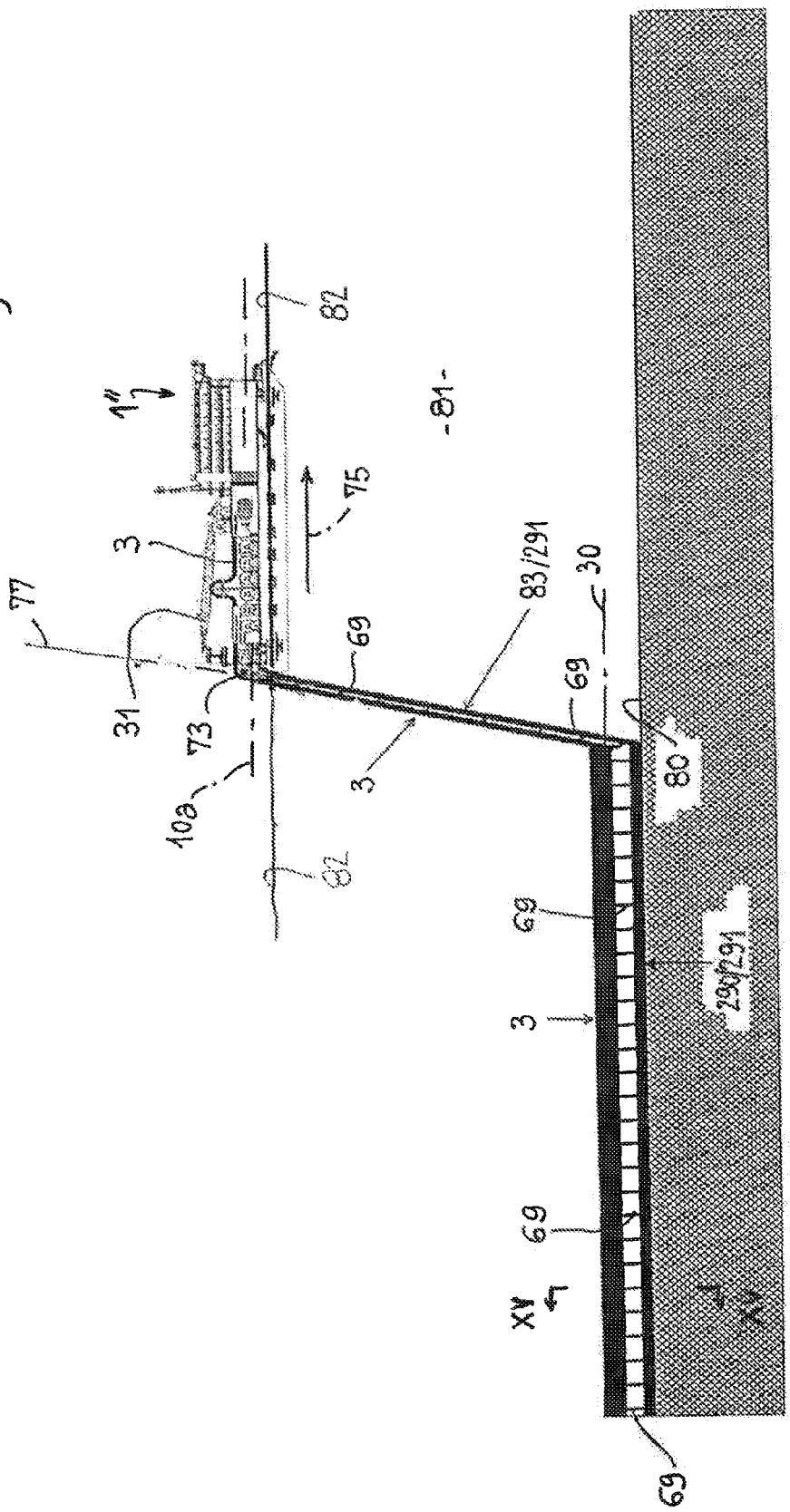
FIG. 14 shows a variant of FIG. 1, in terms of the laying solution.

In FIG. 14 and the following figures, a different laying solution, without winch, and thus with lesser forces exerted on the pipe 3 (abutted portions) is illustrated.

Figure 15:
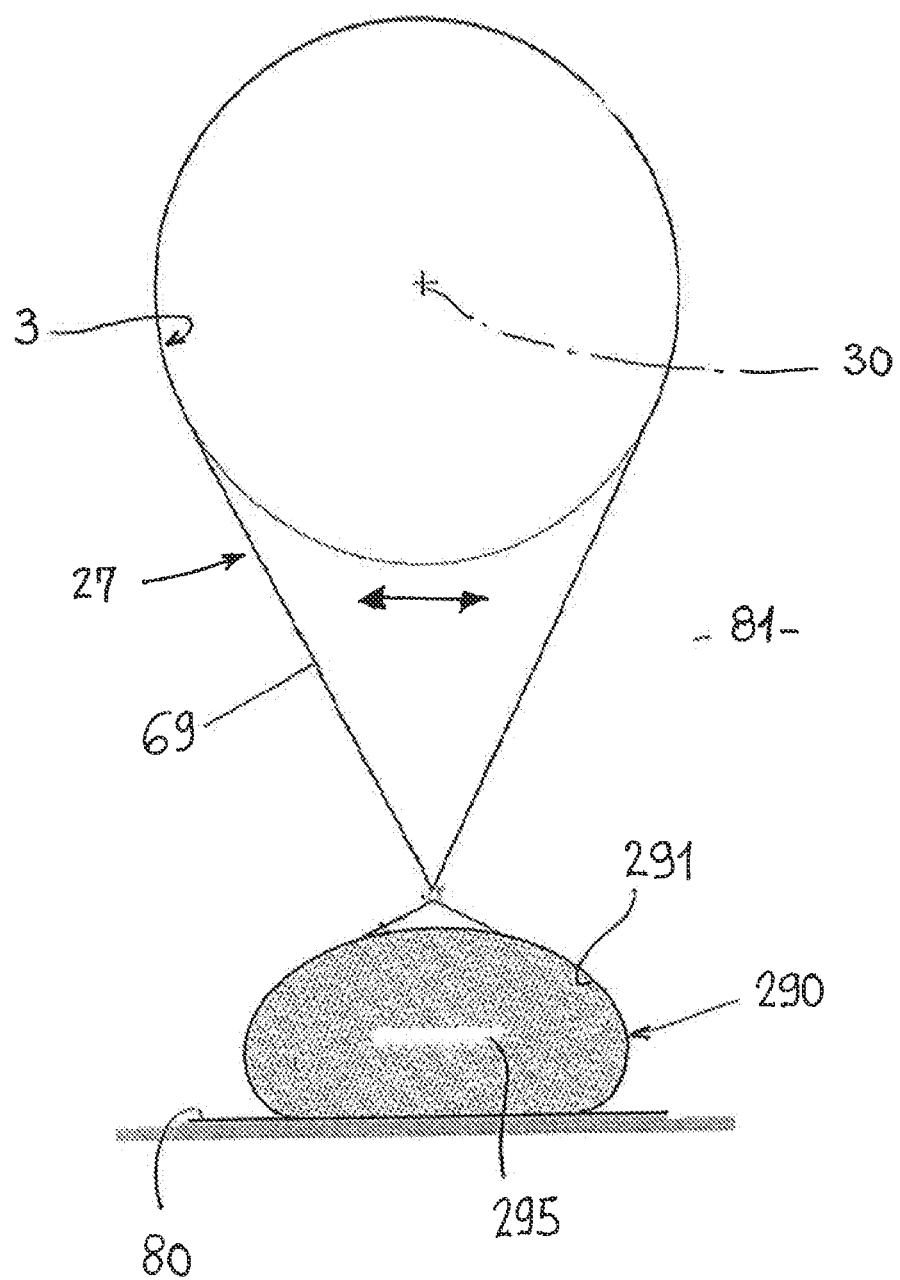
FIG. 15 shows, in cross section with respect to the longitudinal axis (section XV-XV), a flexible connection, for absorbing forces, between a pipe and its ballasting system disposed alongside.
Figure 16:
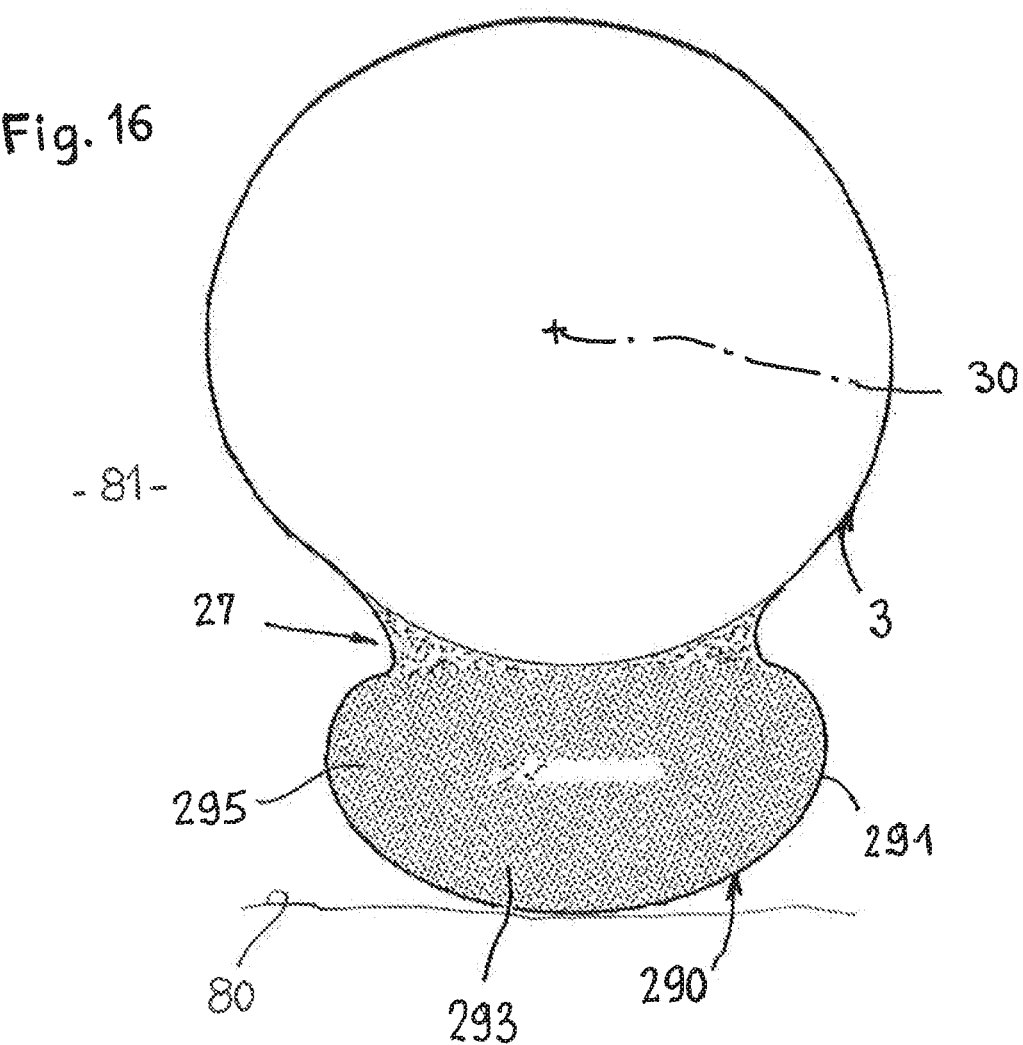
FIG. 16 shows a one-piece pipe with its ballasting system, respectively in cross section with respect to its longitudinal axis.

Two possibilities are still envisaged for driving the pipe 3 downward, in the direction of the submerged laying site 80, while the floating structure, or the laying ship, 1, 1', 1" is at a greater height 82 than that of the site:

- a ballasting system 290, 291, 295 which is connected to means 69 for securing said ballasting system to the pipe (FIG. 15), or
- a ballasting system which is in one piece with the pipe (FIG. 16).

In both cases, the ballasting system does not float in water.

In FIGS. 15 and 16, the ballasting system comprises a flexible ballasting envelope 291 that contains, without mixing with the liquid to be transported, a ballast 295 having a bulk density greater than that of sea water, the envelope, thus ballasted and submerged in a fluid (in this case liquid 81) exhibiting nonstationary movements, tending to rest on the bottom 80 of the submersion site.

In FIG. 16, the pipe 3 of the type already presented is provided with a ballasting system 290 that is in one piece therewith and which comprises a (or at least one) tubular sheath that is defined by the membrane 291 which is connected to that of the pipe in order to form a pouch 293 in which the heavy ballasting material 295 is disposed. Preferably, the hollow and flexible sheath will extend longitudinally, parallel to the axis 30. It may be segmented into compartments.

Figure 17:
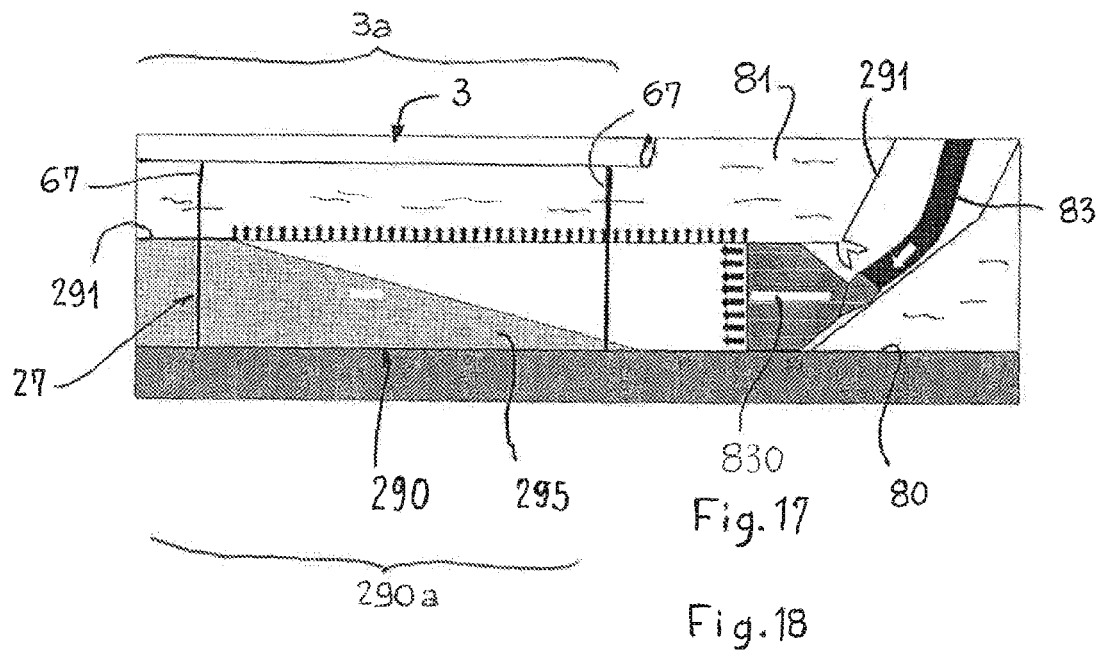
FIGS. 17 and 18 show two possible solutions for supplying ballast at the bottom of the submersion zone, for example in the context of the solution in FIG. 14.
Figure 18:
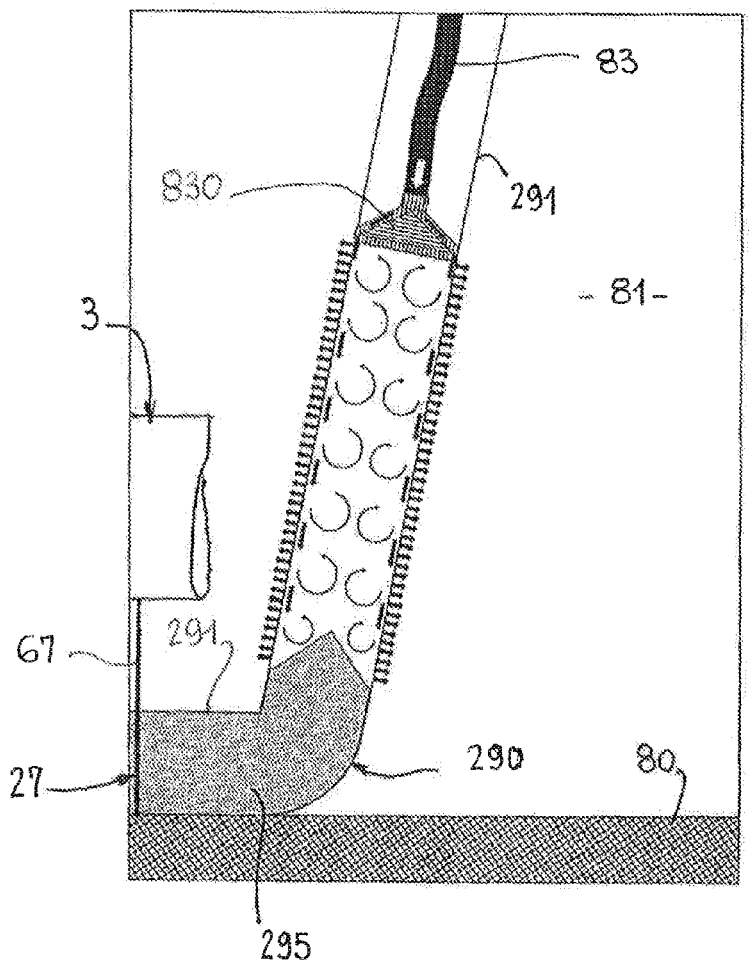

In FIGS. 17 and 18, it is possible to see that, if a granular material is used for ballasting the pipe 3, the means 83 for supplying this material, such as a flexible line, will preferably have an end opening 83 for discharging the material toward the bottom (FIG. 18), or at the bottom (FIG. 17), of the fluid 81 in which the pipe is submerged, in and in contact with the ballasting envelope 291.

It should be understood in this respect that either it is possible to ballast the pipe 3 before submerging it (as in FIGS. 1 and 10) by combining the ballasting system and ballast(s), or it may be preferable to dispose the ballast later, in particular:

- once the pipe 3 and the (portion located opposite it of the) ballasting system (hitherto empty or essentially empty) 290 have reached as far as very close to the bottom 80 above which the laying fluid 81 extends (a few meters to several tens of meters from the bottom), as in FIG. 18, or
- once the portion (such as 291a) of the sheath facing the corresponding pipe portion (such as 3a) is already substantially stretched along the bottom 80, as in FIG. 17.

It will be understood that, in both cases, a tubular envelope 291 that forms a single longitudinal sheath or a limited number of very elongate sheaths (each several hundred to several thousand meters long) will be chosen.

And then, preferably:

- with the pipe portions 3 previously brought into abutment and provided with the (one-piece or multi-piece) ballasting system, the sheath will be submerged empty or substantially empty, and
- with the pipe 3 and sheath 291 submerged, a material having a bulk density greater than that of the fluid 81 will be introduced into the sheath.

In order to ballast the pipe 3 with a granular material (such as sand), it is furthermore recommended, with reference to FIG. 14, that the line 83 for supplying the granular ballasting material 295 be fed from the surface 82. It is possible to provide that, just beyond (typically behind) the laying structure or ship 1", the line 83 is submerged, in the tubular sheath 291 (see FIGS. 17 and 18), parallel with the pipe, after this pipe has been provided with its ballasting system 290 (a priori on the floating structure 1"). It will be recalled that at this time said ballasting system does or does not then make the pipe/ballasting system assembly unable to float, since the ballast itself is not yet necessarily present. On the other hand, the securing 27 of the ballasting system to the pipe has already been carried out, preferably downstream of the joining of the pipe portions together.

Furthermore, in a submersion liquid, such as 81 (sea water in this case), which exhibits nonstationary movements, the solution in FIG. 15, where the ballasting system, provided with ballast 295 in the envelope 291, is secured to the pipe by the flexible connection 69 (which belongs to the securing means 27) will be preferable a priori to that in FIG. 16.

Thus, and as is also possible in FIG. 2, the submerged pipe 3 (filled with fresh water) will be allowed to sway (in the sea water) with respect to the ballasting system, depending on the nonstationary movements of the submersion liquid, while the mass (29, 295) of the ballasting system provided with its ballast keeps said pipe essentially fixed (see double arrow in FIG. 15).

It will furthermore be noted that in FIGS. 2, 14-15 and 17-18 an attempt has been made to illustrate the advantage which there can thus be when the pipe 3 is secured with an ability to move with respect to the ballast, by way of passing a hoop 65 around the pipe and/or a cable, such as 67, which is preferably flexible, or else a flexible binding solution 69.

With respect to the solution in FIGS. 1-2, the solution in FIGS. 14-15 and 17-18 furthermore has the advantage of avoiding subjecting the pipe, at the time that it is submerged, to the axial tensions that are imposed by the solution in FIG. 1 and are applied in particular by the winch 25. Admittedly, it is preferable for the pipe 3, which is to be submerged by way of the stern roller 73 of the ship 1", to be more or less tense axially, but it is especially the already submerged mass of the elongate strip formed by the part of the pipe 3 already at the bottom and subjected to the ballast(s), which ensures that the rest of the assembly 3/290 (which is in this case not ballasted during its descent) descends toward the bottom 80, at an inclined gradient 77 (see accordingly FIG. 14), in conjunction with the advancement of the ship 1" such that its longitudinal axis 10a, that 30 of the ballasted pipe at the bottom and the direction of advancement 75 are substantially parallel, the ballasted pipe being unwound and being laid at the bottom, behind the ship 1".

The limitation of the mechanical tension on the pipe 3 that is ensured by the solution in FIG. 14 and the following figures which makes it possible to submerge the pipe in the water 81, and to keep it on or toward the bottom 80 of the submersion site, as this pipe is submerged under tension behind the floating structure 1" which moves on the surface (82) and to which it is connected by the laying device (drum 15, motorized paying-out device 17, positioning means 19, joining means 21, 22 etc.) should also be noted (in comparison with the solution having a winch in FIGS. 1-13).

To this end, the floating structure 1" thus comprises (like the structure 1, 1'):
  means (such as 38, 40 and/or 42) that enable it to move in a motorized manner, in order to navigate, and
  means (such as 83) for supplying ballast (such as 295) and making it possible to supply such a ballast to the ballasting system 290, on or toward said submersion bottom 80 (cf. FIG. 17 or 18), where (as for example shown in FIG. 17) a first part of the pipe (3a) and of the ballasting system (290a) with which it is provided is already kept, by the ballast already present in this first part of the ballasting system.

It should be understood that either it is possible to ballast the pipe 3 before submerging it (as in FIGS. 1 and 10) by combining the ballasting system and ballast(s) (also known as heavy mass(es)), or it may consequently be preferable to dispose the ballast later, in particular:
  once the pipe 3 and the (portion located opposite it of the) ballasting system (hitherto empty or essentially empty) 290 have reached as far as very close to the bottom 80 above which the laying fluid 81 extends (a few meters to several tens of meters from the bottom), as in FIG. 18, or
  once the portion (such as 291a) of the sheath facing the corresponding pipe portion (such as 3a) is already substantially stretched along the bottom 80, as in FIG. 17.

It will be understood that, in these two last cases, a single longitudinal sheath 291 or a limited number of very elongate sheaths (each several hundred to several thousand meters long) will be chosen.

Still in particular in order to control the laying forces, it is then possible, preferably:
  with the pipe portions 3 previously brought into abutment and provided with the (one-piece or multi-piece) ballasting system, that the sheath 291 will be submerged empty or substantially empty, and
  with the pipe and sheath submerged, that a material having a bulk density greater than that of the fluid 81 will be introduced into the sheath.

The invention claimed is:

1. An assembly comprising:
  a pipe for transporting liquid having a longitudinal axis and being flexible, deformable between a circular internal section and a flattened internal section which may be zero, and foldable longitudinally on itself, and
  a device for laying the pipe at a site, the laying device having a longitudinal axis and comprising a rotary drum around which a first pipe portion is wound, wherein the first pipe portion is wound around the drum in a state in which its section is flattened, along a flattened strip, the laying device further comprising:
  a motorized paying-out device for unwinding the pipe,
  positioning means for positioning the first pipe portion output by the drum opposite a second portion located downstream of the first with respect to the pipe laying direction, in a state in which the portions are shaped so as to match one another, their sections being less flattened than on the drum,
  joining means for a watertight connection between the first and second pipe portions in the state in which they are shaped so as to match one another, and for obtaining the elongate pipe, and,
  tensioning means for transmitting to the elongate pipe an axial tension for advancing downstream and/or for moving back upstream.

2. The assembly of claim 1, wherein the positioning means comprise means for shaping the first and second pipe portions, having, upstream and downstream of the joining means, sections which respectively increase and decrease in size from upstream to downstream along the longitudinal axis of the laying device, and which the first and second pipe portions follow, passing around and along these sections.

3. The assembly of claim 1 wherein:
  the drum has a width oriented perpendicularly to the longitudinal axis of the pipe, and being greater than half the perimeter of the pipe in a state in which the section of this pipe is circular, and the pipe is wound around the drum, in a flat state or in a state very close to such a flat state, not being folded on itself perpendicularly to its longitudinal axis, or
  the drum has a width oriented perpendicularly to the longitudinal axis of the pipe, and being less than half the perimeter of the pipe in a state in which the section of this pipe is circular, and the pipe is wound in a flat state, being folded on itself perpendicularly to its longitudinal axis, around the drum.

4. The assembly of claim 1 wherein the positioning means comprises:
  a first element that is configured to be received inside first and second pipe portions, via respective free ends,
  a second, hollow element that is disposed around the first element such that the first and second pipe portions can be interposed, along the longitudinal axis of the pipe, between the first and second elements.

5. The assembly of claim 4, wherein at least one of the first and second elements has first and second driving means located in part upstream and in part downstream of the free ends to be joined together of the first and second pipe portions, for driving the first or second pipe portion along the longitudinal axis of the pipe, the upstream part of the first and/or second driving means being configured to temporarily drive the first pipe portion along the longitudinal axis, over a predetermined distance, toward the second pipe portion, or conversely, via the downstream part toward the first pipe portion.

6. The assembly of claim 5, wherein the second driving means are linked to control means in order:
  when the first and second pipe portions have not yet been joined together, to deactivate the downstream part of the first and/or second driving means with respect to the driving of the second pipe portion, and
  when the first and second pipe portions have been brought into abutment by the joining means, to activate the upstream part and/or the downstream part of the first and/or second driving means with respect to the driving of the joined pipe portions.

7. The assembly of claim 1, further comprising a ballasting system which does not float in water and which is connected to means for securing the ballasting system to the pipe such that the pipe and the ballasting system are not in one piece.

8. The assembly of claim 7, wherein
the ballasting system comprises a flexible ballasting envelope that forms at least one tubular sheath and is able to contain, without mixing with the liquid to be transported, a ballast having a bulk density greater than that of sea water, and
the envelope which, with the pipe, is submerged empty or essentially empty, over at least a part of the submersion depth, and is then ballasted by way of a line for supplying granular material fed from the surface of the submersion liquid and submerged, in the tubular sheath, tends, in a fluid exhibiting nonstationary movements, to rest on the bottom of the submersion site.

9. The assembly of claim 7, wherein the securing means comprises a flexible connection that allows a distance between the pipe and the ballasting system with, depending on nonstationary movements of the submersion liquid and while the mass of the ballasting system provided with its ballast keeps it essentially fixed, a possibility for the submerged pipe to sway with respect to the ballasting system.

10. The assembly of claim 7, wherein
where the ballasting system comprises a flexible ballasting envelope that is able to contain, without mixing with the liquid to be transported, a ballast having a bulk density greater than that of sea water, the envelope, thus ballasted and submerged in a fluid exhibiting nonstationary movements, tending to rest on the bottom of the submersion site,
and which comprises means for supplying a granular material, as ballast, the supply means having an opening for discharging the granular material toward the bottom, or at the bottom, of the fluid in which the pipe is submerged, in and in contact with the ballasting envelope, by way of a line for supplying the granular material fed from the surface of the submersion liquid.

11. The assembly of claim 1, further comprising a winch for amplifying the axial tension, at least in order to advance the elongate pipe, downstream of the winch, and over which this pipe passes with its flattened or very nearly flattened internal section.

12. The assembly of claim 11, wherein the winch is a capstan winch and comprises a plurality of motorized rollers, each for transmitting a part of the axial tension, and about which the elongate pipe passes, without passing all the way round, with its flattened or very nearly flattened section.

13. A floating structure comprising the assembly of claim 1 and disposed on a deck of the floating structure.

14. The floating structure as claimed in claim 13, wherein:
the drum rotates about a horizontal axis,
the drum is able to move on the deck, transversely with respect to the longitudinal axis of the pipe, and is mounted in a removable manner on this deck,
and a crane, for hoisting the drums, is disposed on the deck, closer to a first edge of the floating structure than to a second edge opposite the first, at which a second rotary drum, about which a third pipe portion is wound, can be hoisted onto the deck via the crane.

15. The floating structure as claimed in claim 13, which comprises, in order to submerge a pipe in water and keep it at or near the bottom of a submersion site, as this pipe is submerged empty, under tension, behind the floating structure which moves on the surface and to which it is linked by the assembly:
moving means for navigation, and
means for supplying ballast, making it possible to supply such ballast to the ballasting system, at or toward the submerged bottom, at which a first part of the pipe and of the ballasting system with which it is provided is already kept, by ballast already present in this first part of the ballasting system.

* * * * *